Dec. 19, 1944.   H. R. FISCHER ET AL   2,365,536
HYDRAULIC POWER PLANT
Filed Nov. 18, 1939   10 Sheets-Sheet 1

INVENTORS
Howard R. Fischer.
Edward W. Stevens.
BY
Raymond G. Mullee
ATTORNEY

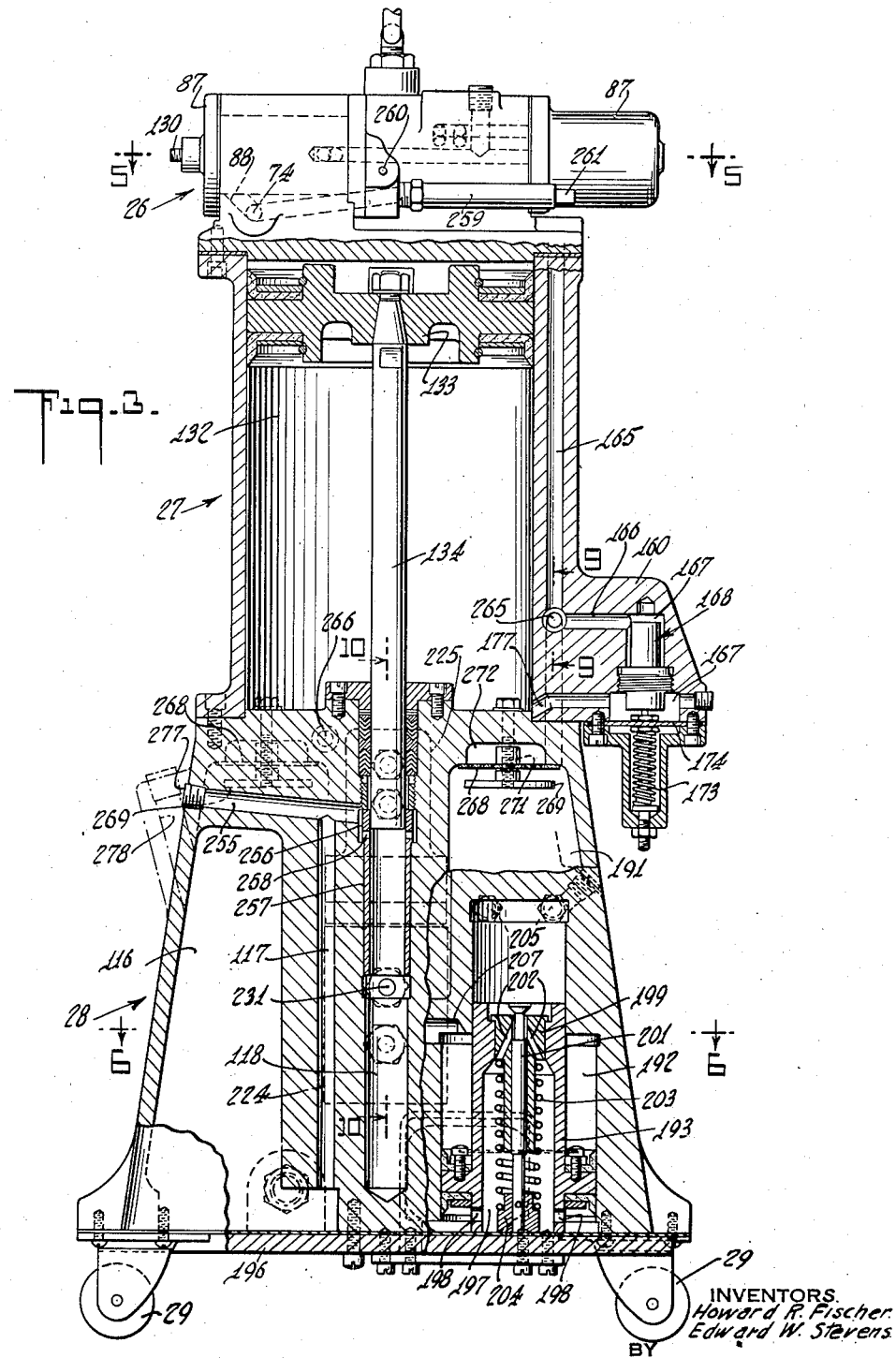

Dec. 19, 1944.    H. R. FISCHER ET AL    2,365,536
HYDRAULIC POWER PLANT
Filed Nov. 18, 1939    10 Sheets-Sheet 3
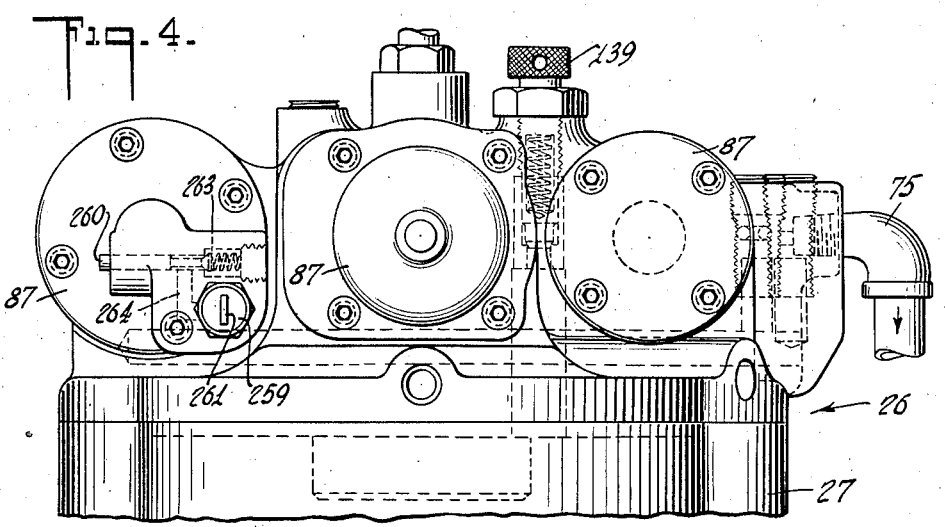
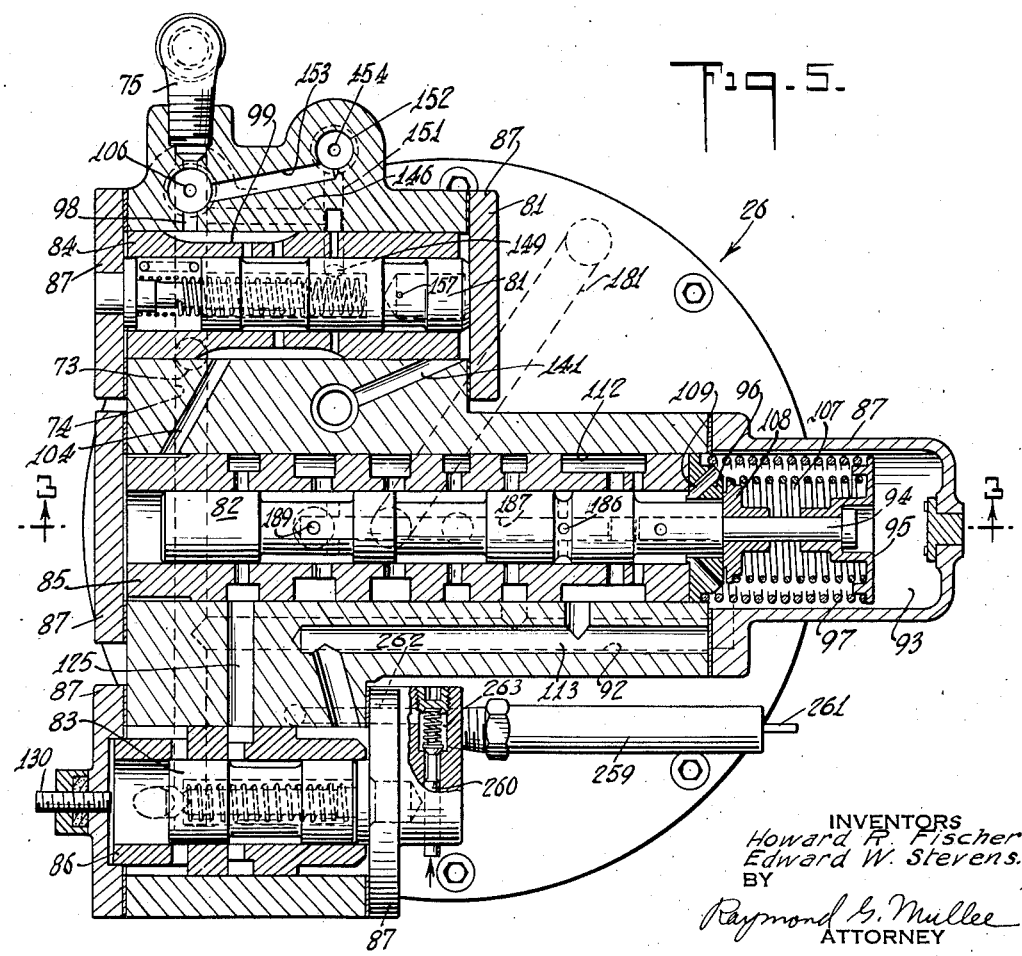
INVENTORS
Howard R. Fischer
Edward W. Stevens.
BY
Raymond G. Mullee
ATTORNEY Dec. 19, 1944.  H. R. FISCHER ET AL  2,365,536
HYDRAULIC POWER PLANT
Filed Nov. 18, 1939  10 Sheets-Sheet 4

INVENTORS
Howard R. Fischer.
Edward W. Stevens.
BY
Raymond G. Mullee
ATTORNEY

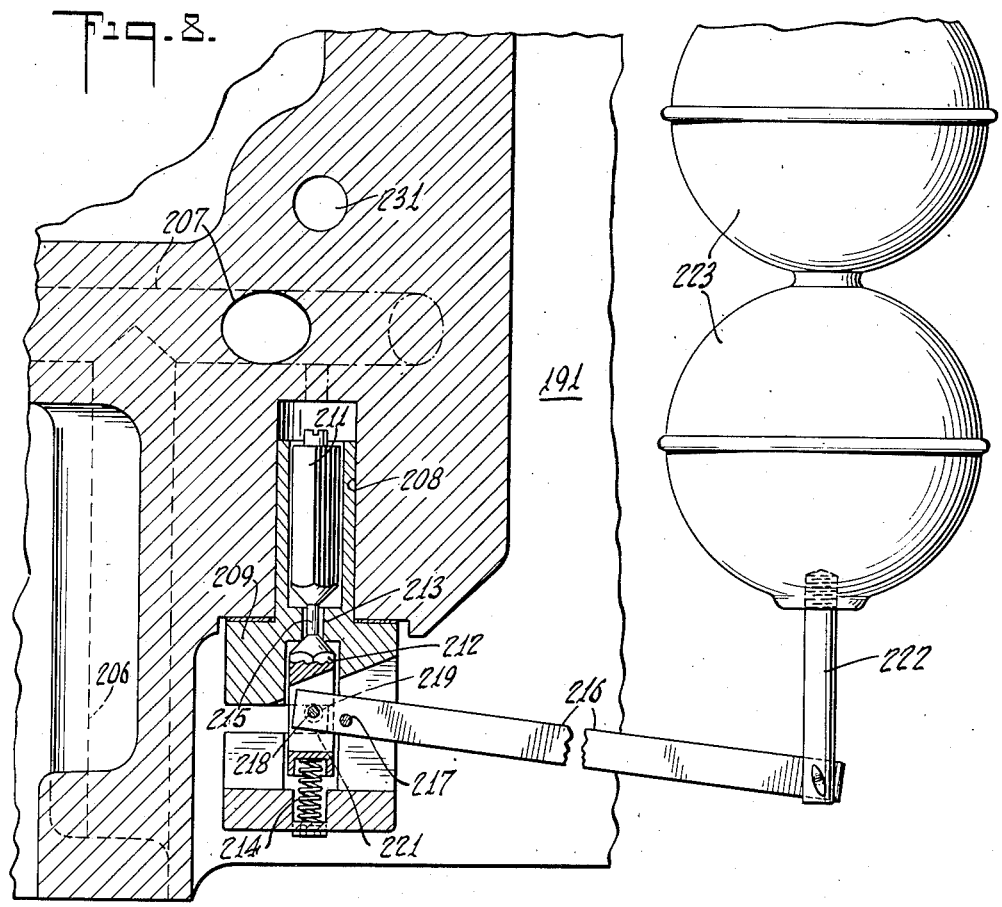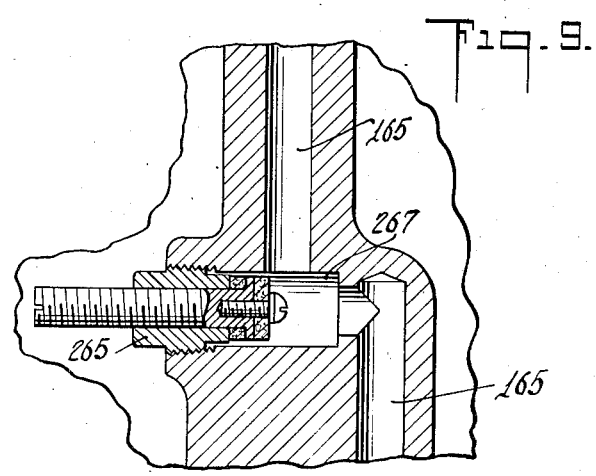

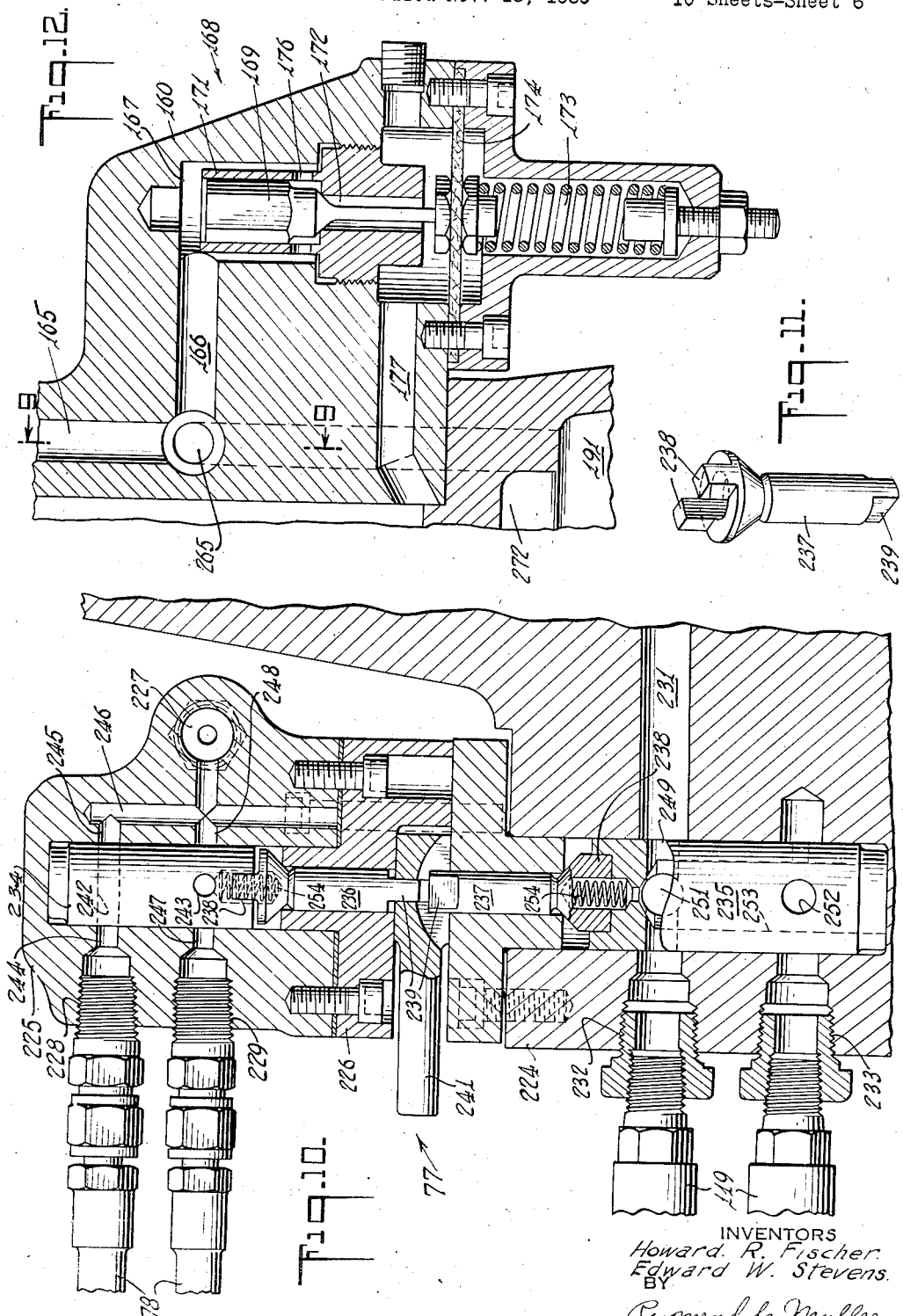

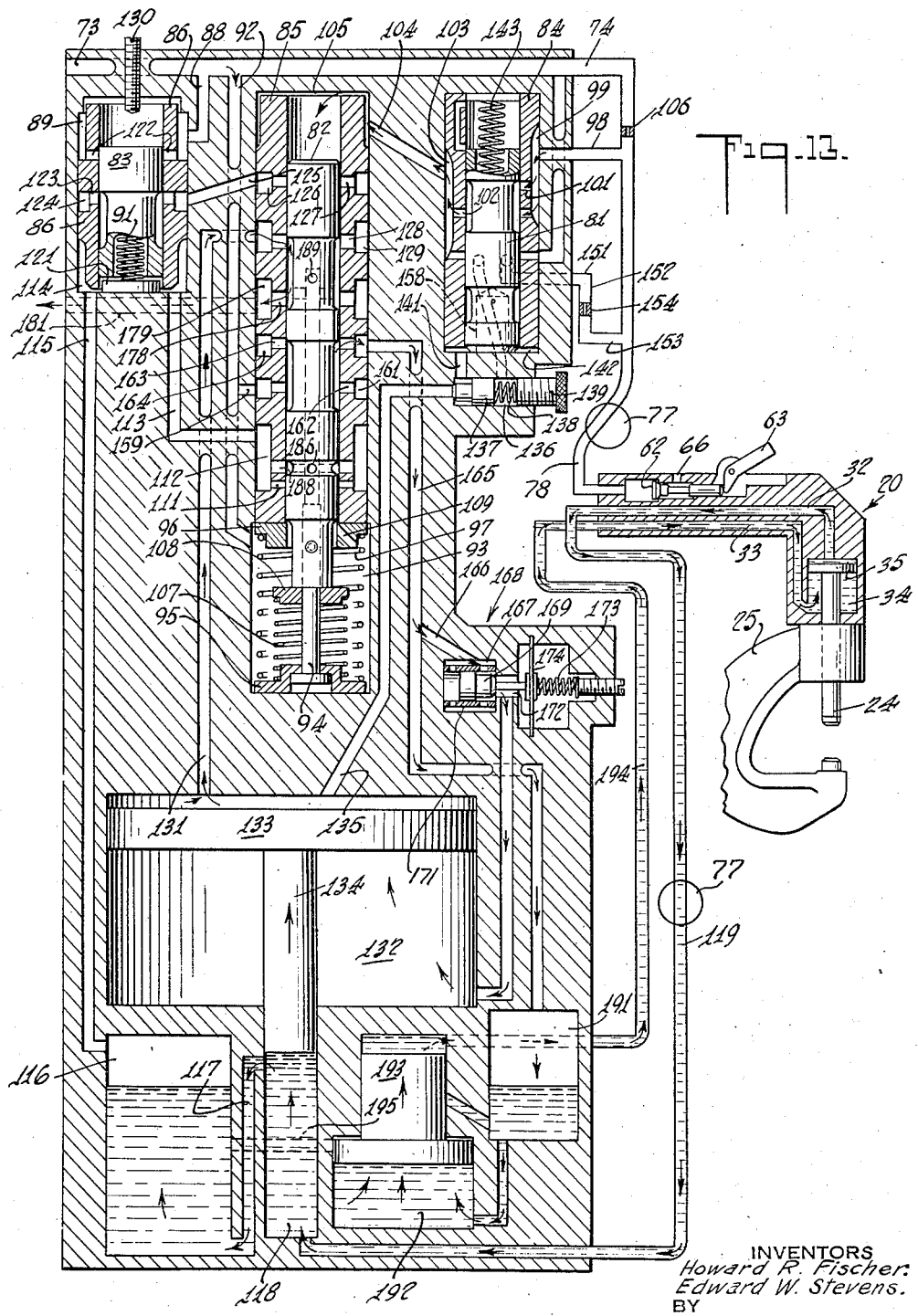

Dec. 19, 1944.  H. R. FISCHER ET AL  2,365,536
HYDRAULIC POWER PLANT
Filed Nov. 18, 1939   10 Sheets-Sheet 8

INVENTORS
Howard R. Fischer
Edward W. Stevens.
BY
Raymond G. Mullee
ATTORNEY

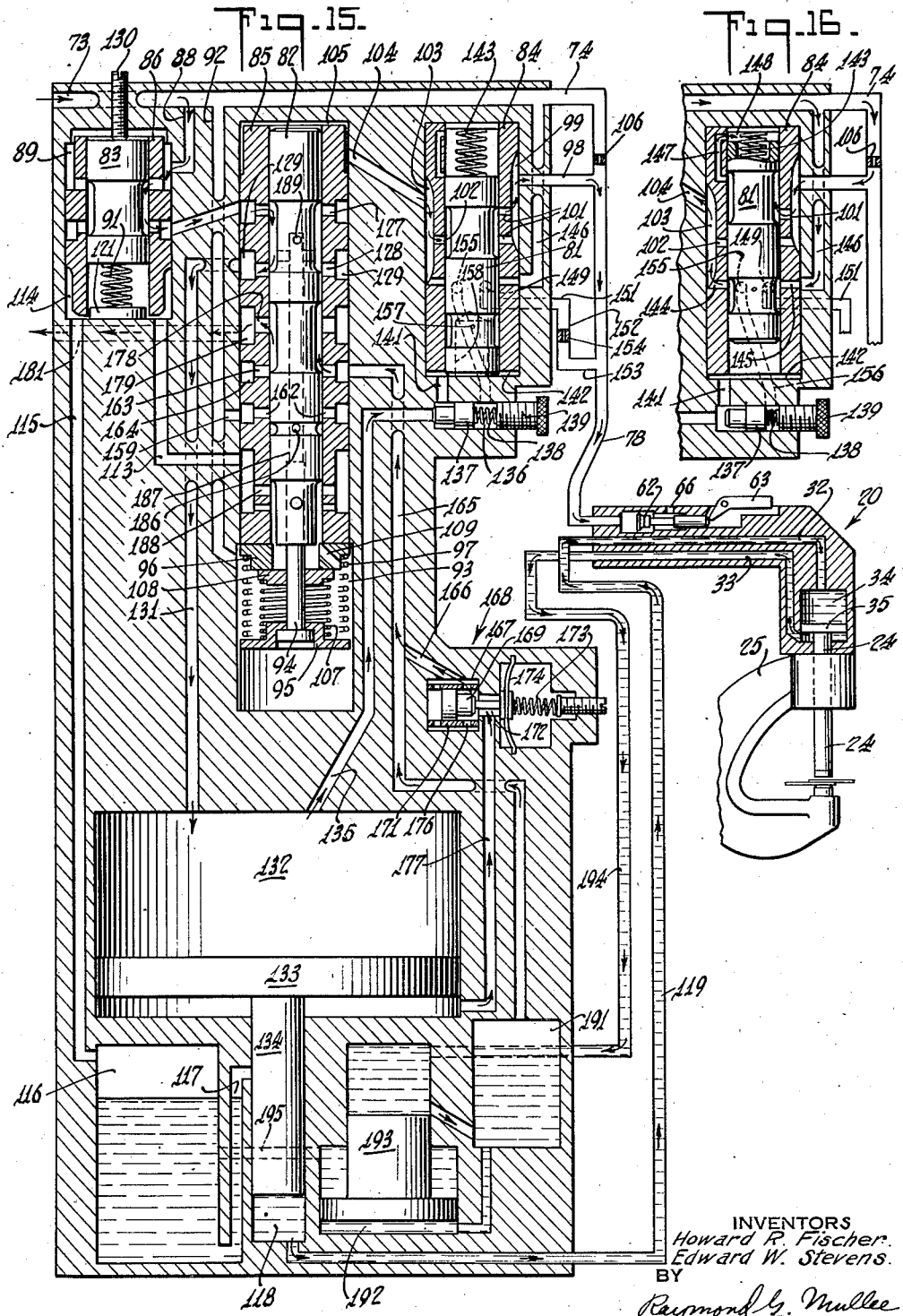

Patented Dec. 19, 1944

2,365,536

UNITED STATES PATENT OFFICE 2,365,536

HYDRAULIC POWER PLANT

Howard R. Fischer and Edward W. Stevens, Detroit, Mich., assignors to Chicago Pneumatic Tool Company, New York, N. Y., a corporation of New Jersey Application November 18, 1939, Serial No. 305,204

21 Claims. (Cl. 60—54.5)

This invention relates generally to a portable power generating unit to which one or a plurality of riveting units may be attached.

According to a feature of the present invention, the power generating unit comprises, in addition to the hydraulic system for effecting operation of the riveting unit, a valvular controlled compressed air system for actuating the hydraulic system.

The principal object of the invention is to produce a small compact power plant of the hydraulic type that is completely automatic in its operation and which may be readily adapted for use in different classes of riveting work.

Numerous features of novelty are embodied in the machine and it is a more specific object of the invention to produce a machine having the following novel features:

1. A compressed air distributing system by which the several steps of a riveting operation are controlled automatically, and which automatically terminates a cycle of operation;

2. An adjustable means for varying the peak pressure obtainable in the compressed air system in order that a maximum of efficiency may be attained in heading rivets of different size;

3. Remote control means for the power generator including a manipulative trigger attached to the handle of the portable riveting unit; and 4. Automatic means, capable of operation prior to the release of the manipulative trigger, for returning the power and riveting pistons to normal position, thereby speeding up operations in which a number of rivets are headed in rapid succession.

Other objects of the invention, additional features of novelty, and structural details of the machine will be more apparent from the following description when read in conjunction with the accompanying drawings wherein:

Fig. 3 is a view, partly in section and partly in elevation, of the power generating unit;

Fig. 4 is a view, in elevation, of the head section and a fragmentary portion of the cylinder of the power generating unit;

Fig. 5 is a view, in section, of the head of the power generating unit, and is taken substantially along the line 5—5 of Fig. 3;

Fig. 8 is a detail view of a certain valve control mechanism which functions to maintain a proper balance of oil in the oil reservoirs looking in the direction of the arrows 8 in Fig. 6;

Fig. 9 is a detail view of a shut off valve and is taken substantially along the line 9—9 of Fig. 3;

Fig. 10 is a detail view, in section, of the two way valve assembly;

Fig. 11 is a detail view, in isometric, of one of the valve stems embodied in the two way valve assembly;

Fig. 12 is a detail view, in section, of a reducing valve assembly;

Figs. 13–15 are diagrammatic views and illustrate the machine in its respective normal, intermediate and fully actuated positions;

Fig. 16 is a diagrammatic detail view of the return valve in actuated position.

Figure 1:
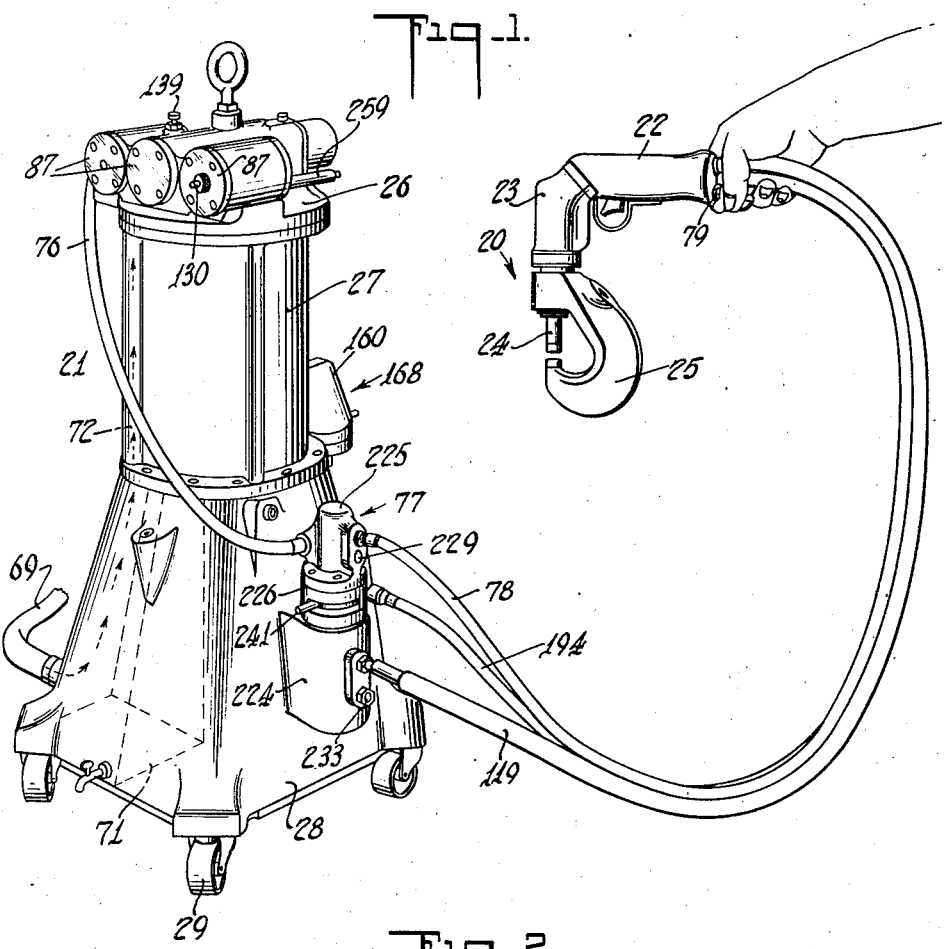
Fig. 1 is a view, in perspective, of the power generating unit and riveting unit completely assembled and ready for operation.

The machine is shown in Fig. 1 completely assembled and ready for operation. The riveting unit and the power generating unit are indicated generally therein by the respective numerals 20 and 21. The riveting unit 20 is connected to the power unit 21 by a plurality of pressure fluid conducting hose lines and is adapted for manual manipulation, independently of the power unit, anywhere within the range of the hose lines. Each unit 20 and 21 is a complete assembly in itself but is formed of several cooperating sections or sub-units, each detachable from the other, to facilitate assembly and replacement, or servicing. The riveting unit 20 comprises, broadly, a handle 22, a cylinder 23, a piston assembly including a piston rod 24, and a yoke 25. The several sections of the power unit include a head 26, in which the principal control valves are mounted, an intermediate section comprising the main compression cylinder 27, and a base section 28 in which is formed the oil reservoirs, pressure outlets and other elements and mechanisms to be described later with greater particularity. The power unit is mounted upon casters 29 to permit the unit to be moved easily from one working point to another.

In constructing this machine advantage has been taken of all known mechanical expedients to insure a maximum of efficiency in its operation. In the specification, no specific mention is made ordinarily of elements such as piston rings or seals, gaskets, and the like, but it should be understood that these elements are provided in the machine, wherever necessary.

Figure 17:
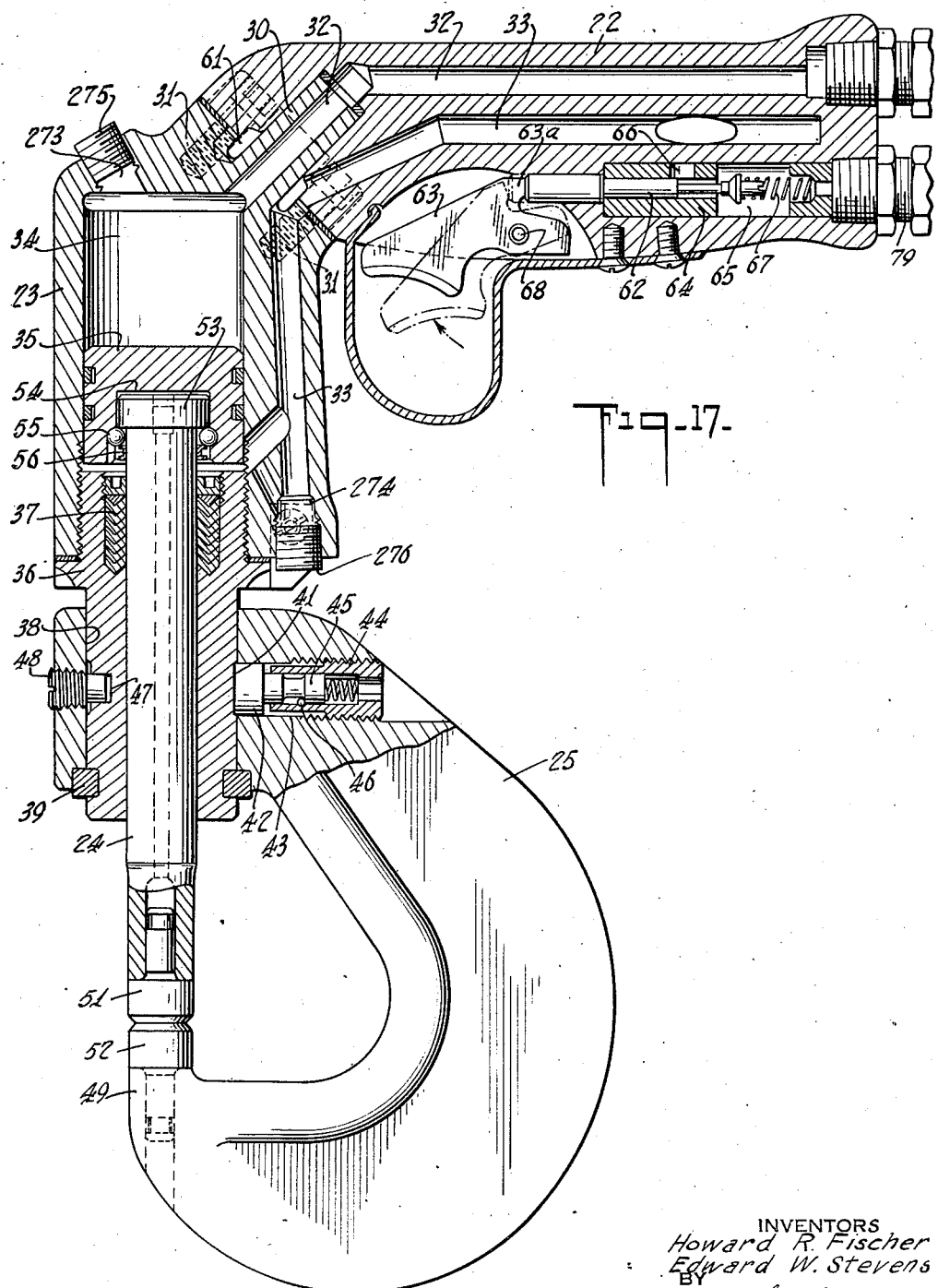
Fig. 17 is a view, chiefly in section, of the riveting unit shown in Fig. 1.

Considering first the riveting unit 20 and referring to Fig. 17, the handle 22 is recessed to receive a pilot portion 30 integral with cylinder 23 and extending therefrom at an angle of 45 degrees relative to the axis of the main part of the cylinder. The handle 22 and cylinder 23 are secured together by means of screws 31 and are so aligned that the fluid conducting passageways formed in each element are joined to form, in effect, two passageways 32 and 33 leading respectively into the upper and lower ends of a piston chamber 34 formed in the cylinder 23. Reciprocable within the piston chamber 34 is a piston head 35 movable from end to end of the chamber under the force of oil pressure supplied alternately through the passageways 32 and 33. The piston rod 24 is secured to the piston head and extends downwardly through a bushing or cylinder extension 36 screwed into the lower end of the cylinder 23. The upper end of the extension 36 closes the lower end of the cylinder 23 to form the piston chamber 34. Packing 37 positioned within the extension 36, about the piston rod 24, acts to prevent the seepage of oil downward between the rod and the extension. Extension 36 projects below the cylinder 23 and the projecting portion thereof passes through a bore 38 formed in the upper end of the yoke 25, thus establishing a swivel connection between the extension and the yoke. In order that the yoke may be held from slipping off the extension a split locking ring 39 is provided which fits into complementary recesses or grooves cut in the extension and yoke. The yoke 25 is normally locked against axial movement relative to the extension by an annular groove 41 in the extension cooperating with a lock plunger 42 which fits a radial bore 43 in the yoke. A screw 44, secured in the bore 43, supports a spring pressed plunger 45 which acts against the lock plunger 42 to hold it in the annular groove 41. Screw 44 supports a transverse pin 46 which projects through an annular recess in plunger 45 to limit its movement in both directions. A plurality of circumferentially spaced bores 47 extend radially inward from the annular groove 41 and are arranged selectively to receive a locking plug 48, if it is desired to inhibit swivel movement and hold the yoke 25 in a selected position of adjustment relative to cylinder 23 and handle 22.

The piston rod 24 extends through the lower end of the cylinder extension 36 and overlies an anvil head 49 formed on the yoke 25. In accordance with the usual construction of devices of this type a replaceable contact head or die 51 is positioned in the lower end of the rod 24 and a similar die 52 is positioned in the anvil head 49. It will further be noted, in connection with the piston assembly construction, that the piston rod 24 is detachably secured to the piston head 35, in order that it may be removed for individual servicing in any respect. The upper end of the piston rod 24 is formed with a head 53 which extends into a recess 54 formed in the piston head 35. A plurality of locking balls 55 are positioned below the head 53, in a groove cut in the inner wall of the piston head 35, and normally hold the piston rod 24 with its head 53 locked within the recess 54. A removable retaining ring 56 is also positioned within the recess 54, below the locking balls 55, and serves to retain the balls in locking position.

Figure 2:
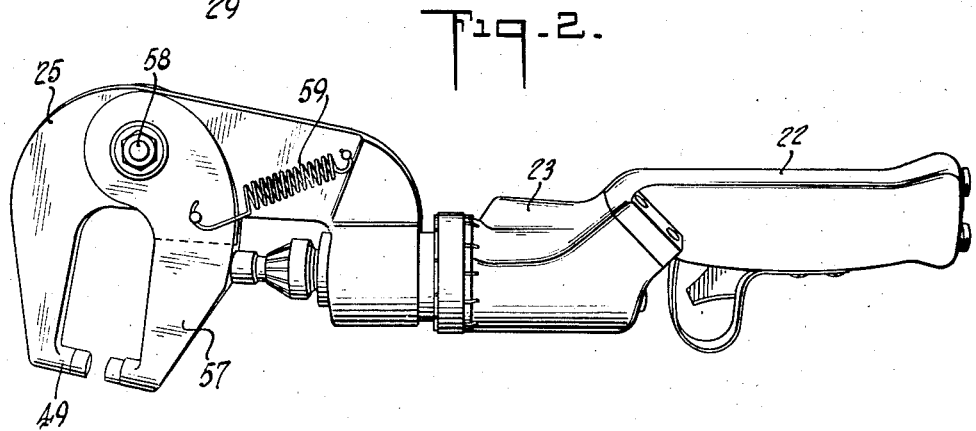
Fig. 2 is a perspective view of a riveting unit of modified construction.

An important feature of the riveting unit is the ease with which it may be adapted for use in operations of varying requirements. Each of the principal elements of the unit is interchangeable with other elements of different construction and a variety of combinations of these elements may be produced. In Fig. 2, for example, one of a variety of different types of yokes is shown which may be used in place of the one illustrated in Fig. 17. In Fig. 2 the anvil head 49 of the yoke is set out of alignment with the piston rod 24, which acts thereon through an auxiliary arm 57 pivoted on the yoke at 58 and urged into contact with the rod by a spring 59. The cylinders 23 vary chiefly in the diameter of their pressure chambers 34 and the selection of a particular cylinder is determined by the size of the rivets to be headed. The handle 22 is also replaceable and may be secured to the cylinder 23 in either of two positions, one of which is illustrated in Fig. 17, and the other in Fig. 2. In Fig. 17, the handle extends at a right angle to the cylinder and may be shifted to the Fig. 2 position merely by removing the screws 31 and reinserting them after turning the handle through an arc of 180° relatively to the cylinder about the axis of pilot portion 30. It will be noted that the separate passages in the cylinder 23 and handle 22 which comprise the passageway 33 are placed in communication with each other through an annular groove 61 surrounding pilot 30 and formed by the alignment of individual recesses in the adjacent ends of the cylinder and handle. Thus, the handle 22 may be turned to any extent relatively to the cylinder 23 and communication between the passages comprising passageway 33 will always be maintained through the groove 61.

Mounted within the handle 22 is the throttle control mechanism comprising a throttle valve 62 and a control lever or trigger 63 for operating the valve. The valve 62 is movable within a bushing 64, positioned within a bore 65 to which live pressure fluid such as compressed air is directed by means later to be described. The bushing 64 is open to atmosphere through a port 66 formed therein and the valve 62 controls the flow of air from the bore 65, through the bushing 64 and out the port 66. The valve 62 is urged to closed position by a spring 67 and normally prevents the escape of air from the bore 65. The throttle control trigger 63 is pivoted, at 68, to an inner surface of the handle 22 and is formed with a shoulder 63a which engages the rearmost end of the valve 62. A clockwise movement of the trigger 63, as viewed in Fig. 17, serves to move the valve 62 to opened position. With the valve 62 in opened position, air is permitted to pass from the bore 65 through the bushing 64 and out the port 66 to atmosphere. This escape of pressure fluid occasions a drop in line pressure in the power generating unit which, in a manner later to be described, conditions the machine for a cycle of operation. In Fig. 17, the valve 62 and trigger 63 are shown in fully operated position, while the normal position of the trigger is indicated in dot-dash outline.

As shown in Fig. 1, a hose line 69 is connected to the base 28 of the power unit 21. Compressed air, generated by means not shown herein, is introduced through the hose line 69 into a chamber 71 formed in the base 28. From the chamber 71 the air passes upward through a passage 72 in cylinder casing 27 and into the head section 26 through an inlet 73 (Fig. 5) formed therein. Inlet 73 opens into a longitudinal main air passage 74 in head 26 and extending into the main air passage is a hose coupling 75 to which is attached an intermediate throttle hose 76 (Fig. 1). As shown in Fig. 1 the hose 76 extends downward and into a two way valve assembly 77, later to be described. Extending from the valve assembly 77 is a main throttle hose 78 connected to a coupling 79 (Fig. 17) which is threaded into the previously mentioned bore 65 formed in riveter handle 22. The line pressure of main air passage 74 is thus maintained, normally, also in bore 65.

Figure 14:
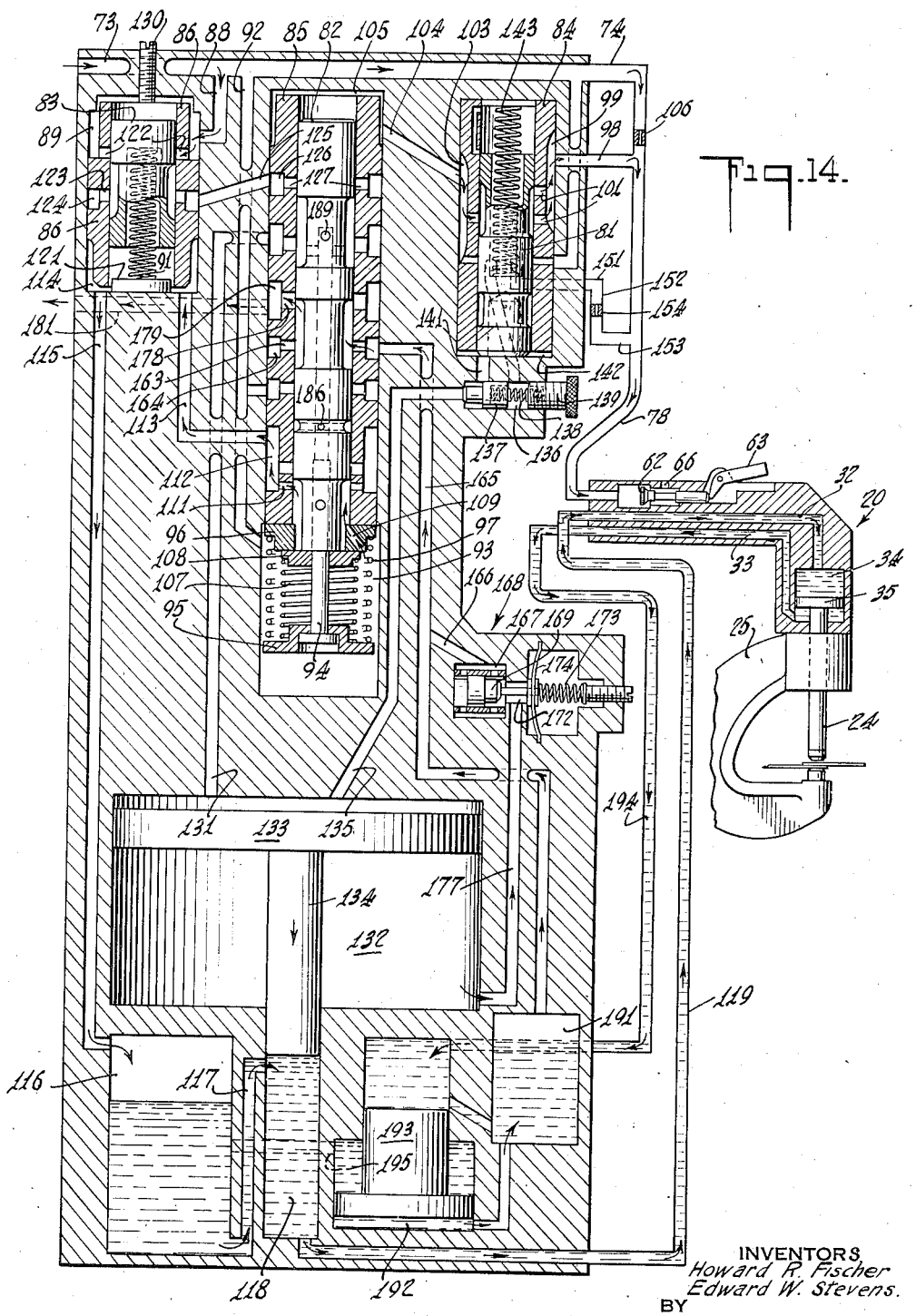

Referring to Fig. 5 and the diagrammatic views, Figs. 13-15 inclusive, it will be seen that the several control valves mounted in the head 26 comprise an automatic return valve 81, a distributing valve 82 and a prefill valve 83, so named for reasons which will hereinafter more clearly appear. These valves are movable within respective cylindrical bushings 84, 85 and 86, each of which is open at both ends in order that air may be introduced therein above and below its respective valve. Each assembly comprising a valve and valve bushing is mounted in a respective bore cut transversely through the head 26. The opposite ends of each bore are closed by closure plates 87 (Fig. 5) appropriately formed to enclose the ends of the valve bushings and to permit freedom of movement of the valves.

The valves 81, 82 and 83 are controlled by individual springs and by pressure fluid supplied either directly or indirectly from air passage 74. Referring to Fig. 13, wherein the valves are shown in normal position, it will be seen that air is supplied directly to the upper end of prefill valve 83 through a port 88 connecting passage 74 and a chamber 89 formed about the upper reduced portion of prefill valve bushing 86. The valve 83 is thus normally held downward, against the tension of a spring 91, by line pressure acting on the upper end of the valve; it being understood that expressions such as "upper" and "downward," when used in this part of the description, refer to the positions illustrated diagrammatically in Figs. 13, 14 and 15. Air is supplied directly also to the lower end of distributing valve 82 by means of a passage 92 leading from main air passage 74 into a chamber 93 formed within the closure plate 87 which encloses this end of the valve (see Fig. 5). A downwardly extending rod 94 is secured to the lower end of the valve 82 and supports a collar 95 at its lower end. Compressed between the collar 95 and an abutment 96, secured to the lower end of bushing 85, is a spring 97 which by reason of its arrangement urges the valve 82 downward, to the position shown in Fig. 13. Normally, line pressure is acting also on the upper end of valve 82, thereby balancing the pressure below the valve, and the spring 97 is free to hold the valve downward in the position shown in Fig. 13. If the air pressure above the valve 82 is reduced below line pressure the valve will be forced upward, against the tension of spring 97, a distance determined by the extent of the reduction of pressure above the valve. Air is directed to the upper end of distributing valve 82 through a series of ports and passageways controlled by the automatic return valve 81. A port 98 connects the main air passage 74 to a groove 99 cut longitudinally in the outer surface of return valve bushing 84. The air passes from groove 99 through a pair of ports 101 in the bushing 84, around a reduced portion of valve 81 and through a port 102, formed in the opposite side of the bushing, into a second bushing groove 103. A passage 104 connects the groove 103 to a chamber 105 formed about the upper reduced portion of valve bushing 85 and thus, in the normal position of the parts, line pressure is supplied constantly to the chamber 105.

A metering orifice 106 is positioned within the air passage 74 intermediate the main inlet 73 and hose coupling 75 so that the unseating of throttle control valve 62, in riveting unit 20, causes an immediate drop in pressure in the line between metering orifice 106 and bore 65, since the air cannot pass through the orifice 106 as rapidly as it escapes through port 66. The extent of pressure reduction in this line is determined by the extent of actuation given the trigger 63. Port 98 communicates with air passage 74 at a point within the area of reduced pressure so that the drop in pressure occasioned by operation of the trigger 63 is reflected also in the ports and passageways leading to chamber 105, above valve 82, and in the chamber itself.

In initiating a cycle of machine operation the trigger 63 may be fully actuated in a single motion or it may be momentarily held in a partially actuated position before completing the full stroke. Since a riveting operation consists of a first stage, in which the rivet is set, and a second stage, in which the rivet is headed, the operation of the machine will be described as consisting of separate stages, the first of which is initiated by a movement of the trigger 63 through a portion of its stroke and the second upon the completion of the trigger stroke. In Fig. 14 the machine is shown in its first stage, or rivet setting operation, with the trigger 63 moved to an initial position intermediate its normal and fully actuated positions. As shown therein the reduction of pressure within chamber 105 has caused the valve 82 to move a short distance upward where it is held by a second compression spring 107 placed between an abutment collar 108 engaging the lower end of the valve, and the previously mentioned collar or spring base 95. In the normal position of the valve 82 the spring 107 is without effect since no relative movement between the valve and the collar 108 is possible until the collar engages the abutment 96. This occurs upon completion of the initial upward movement of the valve 82 and it will be evident that further upward movement of the valve must be accomplished against the combined action of springs 97 and 107. With the valve 82 in the intermediate position shown in Fig. 14 the live air acting upon the lower end of the valve is permitted to pass through a port 109 in abutment collar 96, around the reduced lower end of the valve and a pair of ports 111 into an annular groove 112 formed in the outer surface of the bushing 85. A passageway 113 leads from the groove 112 to a chamber 114 formed around the reduced lower end of prefill valve bushing 86 so that upon the initial movement of distributing valve 82 line pressure is established in chamber 114. Extending from the chamber 114 is a passageway 115 which leads downward through the intermediate section of the unit to the base and opens into a prefill reservoir 116 containing a suitable liquid, such as oil. Live air pressure acting upon the oil in reservoir 116 forces the oil through a passageway 117 into a pressure chamber 118 and thence through means, including a hose line 119, to handle 22 of riveting unit 20. In handle 22 the oil is driven through the passageway 32 and into the upper end of piston chamber 34, forcing piston head 35 and rod 24 downward to set the rivet. The hydraulic system is actuated at this time solely by air pressure within the reservoir 116 so that the pressure obtained in pressure chamber 34 is relatively small and insufficient to actually head the rivet.

Returning now to a consideration of the prefill valve 83 it will be observed that while air is passing from chamber 114 down to the reservoir 116, air is also seeping slowly between the inner edges of bushing 86 and a projection 121 of slightly less diameter than that represented by the inner edges of the bushing. Thus, while the rivet setting operation is in progress, pressure gradually builds up below the prefill valve 83 and, as the gradually increasing pressure counterbalances the line pressure acting on top of the valve, the spring 91 moves the valve upward. The upward movement of the valve 83 is further retarded by reason of the fact that the air, above the valve, can escape only through a narrow opening between the upper end of the valve bushing and the closure plate 87, similar to the opening between the lower end of the bushing and projection 121. The valve 83 is shown in Fig. 14 in an intermediate position with its upper end still closing a pair of ports 122 communicating with the upper chamber 89 which receives line pressure through port 88 directly from the main air passage 74. When the prefill valve has moved upward a slightly further distance it will uncover the ports 122, allowing air to flow through the ports around a reduced portion of the valve and through another pair of ports 123 into an annular groove 124 formed in the bushing 86. The groove 124 is connected, by means of a passage 125, to an annular groove 126 formed in the distributing valve bushing 85. The groove 126 communicates with the interior of the bushing 85 through a set of ports 127 which are closed by the head of the distributing valve in its normal and intermediate positions.

When operating the control trigger 63 in two steps the second step, to fully actuated position, is performed after the rivet setting stage of the operation and may take place before or after the ports 122 are uncovered by the prefill valve. In Fig. 15, the trigger 63 is shown fully actuated and the throttle control valve 62 completely open. The drop in pressure between the riveting unit and the metering orifice 106 is considerable, at this time, and, as reflected in chamber 105 above the distributing valve 82, is sufficient to permit the valve 82 to be moved to its extreme upward position against the tension of the two springs 91 and 107. This movement of the valve 82 from its Fig. 14 position to its Fig. 15 position serves to uncover the ports 127 and permit air to flow through the ports around a reduced portion of the valve and through a second set of ports 128 into another annular groove 129, formed in the bushing 85. Communicating with the groove 129 is a passageway 131 which extends downward and opens into a main compression chamber 132 containing a piston assembly including a piston head 133 and rod 134. Normally, and during the rivet setting stage of operation, the piston assembly in chamber 132 occupies the position shown in Figs. 13 and 14. However, upon the extreme upward movement of the distributing valve, line pressure passing through the above described ports and passageways enters the upper end of chamber 132 and drives the piston assembly downward, as is illustrated in Fig. 15. Piston rod 134 extends downward into the oil pressure chamber 118 and, in moving through the chamber, forces oil at great pressure through the passageways leading into riveting piston chamber 34 to drive the riveting piston assembly downward and complete the rivet heading operation. If, for any reason, it should be desired to prolong the rivet heading operation beyond the normal time in which this operation is performed a means is provided for reducing the flow of air to the chamber 132 to increase the time required to build up sufficient pressure therein to operate the piston assembly. This means resides in a set screw 130 adapted to engage the upper end of the prefill valve 83 to limit the upward movement of the valve. As shown in Fig. 5, the screw 130 extends through the plate 87 enclosing the upper end of prefill valve bushing 86 and may be manually set to any desired position of adjustment. When the valve 83 is prevented from completing its upward movement, the ports 122, controlled by the valve, are only partially opened and the flow of air through the ports is accordingly reduced.

The rivet heading operation being now complete, the trigger 63 may be released. Upon release of the trigger, the air in the passageway 78 between the riveting unit and the metering orifice 106 will build up to line pressure and this pressure can be used to return the distributing valve 82 to its normal position, thereby cutting off the flow of air to the main compression chamber 132 and prefill reservoir 116. However, an automatic control means, which acts independently of the trigger 63, is provided for returning the valve 82 when a predetermined point of peak pressure is reached in the chamber 132. Referring to Fig. 15, a second passageway 135 opens into the upper end of the chamber 132 and extends upward into a bore 136 formed in the head 26. Positioned within the bore 136 is a valve 137 which normally closes the passageway 135 and is urged to closed position by a spring 138. An adjusting screw 139 also extends into the bore 136 and acts upon the spring 138 to increase or lessen the pressure with which it urges valve 137 to closed position. Thus, when the pressure in chamber 132 reaches a sufficiently high point to force valve 137 off its seat, air is permitted to pass from the chamber into the bore 136 and from there through a passage 141 into a chamber 142 below the automatic return valve 81. The pressure fluid thus introduced into chamber 142 immediately forces the valve 81 upwards, against the tension of a spring 143, into the position shown in Fig. 16. As shown in the latter figure, the valve, when in its upper position, closes the port 102, leading into groove 103, but establishes communication between this groove and the interior of the bushing 84 through another port 144. Also formed in the bushing 84, opposite the port 144 and opened by upward movement of the valve, is a port 145 communicating with a passageway 146 leading directly from the main air passage 74. The passageway 146 opens into the main air passage at a point between the air inlet 73 and metering orifice 106 so that full line pressure may pass through passageway 146 and port 145 around a lower reduced portion of valve 81 and then through port 144 into groove 103. From groove 103 the air flows, of course, through passage 104 into chamber 105 above the distributing valve 82, forcing this valve downward to the normal position of Fig. 13 and thereby closing ports 127 and 111 to stop the flow of pressure fluid to chambers 132 and 116 respectively.

Still referring to Fig. 16, it will be seen that the air of reduced pressure below the metering orifice 106 flows from groove 99 in bushing 84 through the upper one of the ports 101, around the upper reduced portion of the valve 81 and then through a passage 147, formed in the bushing, into a chamber 148 above the valve. As the air in chamber 148 builds up to a sufficient pressure to balance the pressure acting upon the lower end of the valve, the spring 143 returns the valve downward to its normal position. This occurs upon the closing of the throttle valve 62.

In order to speed up the return action of the valve 81, an auxiliary return connection may be provided. The bushing 84 is formed with a port 149, normally closed by the valve 81, communicating with a passage 151 leading into an opening 152 (Fig. 5) from which extends another passage 153 opening into the main air passage 74 below the metering orifice 106. Upon upward movement of the valve 81, the lower reduced portion thereof is placed opposite the port 149 and line pressure passing around this reduced portion from port 145 is admitted through the port 149 to passages 151 and 153. A metering orifice 154 is positioned in the opening 152 (Fig. 5) and delivers, at a restricted rate, compressed air into passage 153 and hose 78, thereby complementing the action of orifice 106.

It is also desirable, for quick and efficient operation of the machine, that the relief valve 137 be returned to its seat immediately after it has performed the function of causing the operation of valve 81 to the Fig. 16 position. To insure prompt action of valve 137 line pressure, when admitted through port 149, in bushing 84, is also admitted through a similarly formed port 155 to a passageway 156 leading into the bore 136 at a point to the rear of the valve 137. The combined action of the spring 138 and air at line pressure thus produces an ample force for the return of the relief valve, and chamber 142, below the valve 81, is positively cut off from the chamber 132.

In order that the valve 81 may be retained in its upper, or actuated position, for the time necessary to accomplish the return of the distributing valve 82, a small opening 157 is formed in the lower reduced portion of the valve 81 which communicates with a bore 158 drilled in the lower end of the valve. Pressure fluid from port 145 thus passes also through the opening 157 and bore 158 into the chamber 142 and acts upon the lower end of the valve 81. After the closing of relief valve 137 air is supplied to the chamber 142 only through the opening 157.

If, and as long as, the operator, subsequent to the completion of the rivet heading stroke of pistons 133 and 35, continues to hold the throttle valve 62 open, the automatic return valve 81 will be held in its upper or operated position illustrated in Fig. 16 by the preponderance of the pressure of substantially live air, delivered through opening 157 and bore 158, over the opposing combined pressures of spring 143 and fluid under reduced pressure. Under these conditions such reduced pressure, in hose 78 and associated passages, does not initiate a new cycle of operation as before, because the automatic return valve 81 is now positioned to deliver live air through passage 104 to the upper end of distributing valve 82. Upon release of throttle valve 62 to closed position, air pressure in hose 78 builds up to line pressure to balance the fluid pressures at the ends of valve 81 and permit the spring 143 to restore it to the normal (Fig. 13) position. The auxiliary passage 153, associated with metering orifice 154, performs an important, though not indispensable, function in augmenting the rise in pressure in hose 78 with the consequent restoration of valve 81 to normal, following the close of throttle valve 62. The operator, therefore, may reopen the throttle valve to head a new rivet without any appreciable delay on account of the restoration of valve 81 subsequent to the closing of the throttle valve.

The return stroke of the main driving piston 133—134 begins immediately upon the return of the distributing valve 82 to normal. Since the driving piston encounters less resistance on its return than on its power stroke, reduced pressure may be used for its return, thereby effecting a saving in compressed air. As shown in Fig. 13, in the normal position of the valve 82 air, at line pressure, flows through a branch 159 of the passageway 92 into an annular groove 161 in distributing valve bushing 85. From groove 161, the air passes through a set of ports 162, around a reduced portion of the valve 82 and out a set of ports 163 into a second annular groove 164. A downwardly extending passageway 165 communicates with the groove 164 and a branch 166 of the passageway leads into a bore 167 formed in a projecting portion 160 of the cylinder 27 (see Figs. 3 and 12). Positioned within the bore 167 is a well-known type of reducing valve assembly 168, having a valve 169 movable within a bushing 171 to control the flow of air into passage 172. An adjustable spring 173 presses upon the lower surface of a diaphragm 174 to urge the valve 169 to open position while air entering the open upper end of bushing 171 acts upon the upper end of the valve to close it when the diaphragm is forced downward. The air flows into the upper end of bore 167, through a set of ports 176, in the bushing 171, and past the valve 169 to the passage 172 where it is directed to the lower end of bore 167 and out a passage 177. In passing from passage 172 to passage 177 the air acts on the upper surface of the diaphragm 174 and presses it downward against the tension of spring 173. The valve 169 is thus allowed to move downward to a partly closed position and, as a result, the pressure of the air passing from the lower end of bore 167 is substantially less than that of the air entering the upper end of the bore. The passage 177 opens into the lower end of compression chamber 132, below the piston head 133, and the air of reduced pressure thus introduced below the piston head serves to return the piston to its normal upper position.

Provision is made for directing air, trapped on either side of the piston head 133, to exhaust. Referring to Fig. 13, it will be seen that during the upward travel of the piston 133—134, the air above the piston is forced out of the chamber through the passageway 131 and enters groove 129. From groove 129 the air passes through ports 128 around the upper reduced portion of valve 82 and out a pair of ports 178 into an annular groove 179 formed in the bushing 85. Communicating with groove 179 is a passageway 181 leading, in a manner not shown herein, to an exhaust chamber 182 (see Figs. 6 and 7) formed in the base 28. Extending into the chamber 182, through an opening in the base plate 180, is a muffler comprising a perforated retainer 183 filled with copper wool or a like substance. A closure plate 184 covers the lower end of the retainer 183 and exhaust air is permitted to pass through the retainer and out openings 185 in the plate 184, to atmosphere. During the downward movement of the piston 133—134, the distributing valve 82 is in its uppermost position and, as shown in Fig. 15, the exhaust port 178 is, at this time, opposite a lower reduced portion of the valve and is thus in communication with the ports and passageways leading into the lower end of compression chamber 132. During this portion of the cycle, therefore, the air below the piston head 133 is driven to the exhaust chamber 182, via passages 177, 166, 165, etc.

It is also desirable that chamber 114, below the prefill valve 83, be connected to exhaust in the normal position of the machine in order that the oil in reservoir 116 may return to its normal level. Therefore, an opening 186 is formed in a grooved portion of the distributing valve 82 and communicating with the opening is a longitudinal bore 187 in the valve. In the normal position of the valve 82 (Fig. 13) the opening 186 therein lies opposite a pair of ports 188, in the bushing 85, which communicate with the previously mentioned annular groove 112. Exhaust air is then free to flow from chamber 114 through the connecting ports and passageways to opening 186 and then through longitudinal bore 187. At the upper end of bore 187 another opening 189 is formed in the valve 82 and the air from bore 187 passes out this opening, around the upper reduced portion of the valve and out the exhaust port 178.

Turning now to a further consideration of the hydraulic system it will be remembered that the initial movement of the oil takes place during the first or rivet setting stage of the cycle, when live air under the usual line pressure, say, 90 pounds per square inch, is admitted to the prefill reservoir 116. Then, during the second or rivet heading stage of the cycle, the main driving piston 133—134 is actuated and the oil ahead of the driving piston forces the riveting piston assembly downward substantially to its Fig. 15 position, with a pressure of several tons. In order that the riveting piston may be returned to its normal position after each rivet heading operation, oil is supplied through passageway 33, in the riveting unit, to the lower end of the pressure chamber 34 below the piston head 35. Referring to Figs. 13-15, there is provided in the base section 28 of the power unit, a return oil reservoir 191 into the upper end of which opens the passageway 165. In the normal position of the distributing valve 82 (Fig. 13) air under line pressure flows through this passageway and thence through parallel branches to serve the dual purpose of returning the driving piston 133—134 and acting upon the oil in reservoir 191 to effect the return of the riveting piston. Reservoir 191 is in communication with an oil pressure chamber 192 in which is mounted a return piston 193. Upon the introduction of live air into the reservoir 191 the oil therein is forced downward into the pressure chamber 192 where it acts upon the base of the piston 193 to force it upwards. As the piston 193 moves upward oil above it is forced through means including a hose line 194 to the riveting handle 22 where it is conducted by means of passageway 33 to the pressure chamber 34 where it returns the piston assembly therein to the normal position of Fig. 13. It will be recalled that upon the first step (Fig. 14) of the distributing valve 82 to actuated position the ports 162, by which live air is conducted to the passageway 165, are closed and line pressure is hence cut off from the reservoir 191. Further, the passageway 165 is opened to exhaust at this time so that no air pressure opposes the riveting piston as it descends to its rivet setting and rivet heading positions. On the return stroke of the piston head 35 the oil above it retraces its path through passageway 32, hose 119, and back to the prefill reservoir 116, which is opened to exhaust at this time through chamber 114, below prefill valve 83. On the actuating stroke of piston head 35, the oil below it passes back through passageway 33, hose 194, and on to pressure chamber 192 where it assists in moving the piston 193 downward to the position shown in Fig. 14. The primary force in lowering the piston 193 is oil from the prefill reservoir 116, introduced through a connecting passageway 195 which opens into the pressure chamber 192 at a point above the head of the piston.

Figure 6:
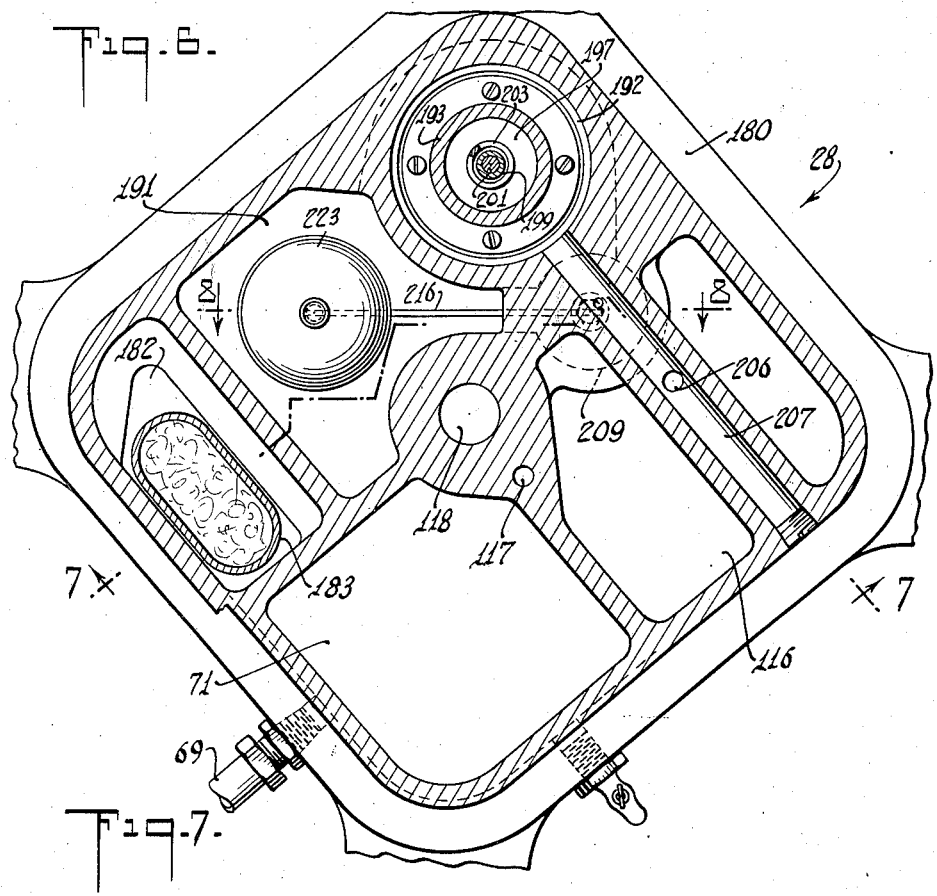
Fig. 6 is a view looking downward through the base of the power generating unit and is taken substantially along the line 6—6 of Fig. 3.

In order that a proper balance of oil may be maintained in the various sections of the hydraulic system certain valvular control mechanisms are provided. As shown in Figs. 3 and 6, the return reservoir 191 and pressure chamber 192 are separated by a wall of the base casting, which does not, however, quite reach the base plate 180 and so permits constant communication between the lower end of the reservoir and the lower end of the chamber. Referring particularly to Fig. 3, the piston 193 is formed with a bore 197 which extends throughout the length of the piston and communicates, through a pair of ports 198, with the lower end of chamber 192 below the head of the piston. Supported within the bore 197 is a bushing 199 in which is mounted a valve 201. The valve 201 is movable within the bushing 199 to open and close a pair of ports 202 by which communication is established between the bore 197 and the upper end of chamber 192 above the piston 193. The valve 201 is urged to closed position by a compression spring 203 extending between a shoulder of bushing 199 and an abutment collar 204 secured to the lower end of the valve, but, in the operated or downward position of the piston, the valve is held in open position by reason of the engagement of collar 204 with base plate 180. The operated position of the assembly is shown in Fig. 3 and it will be seen that, at this time, oil may pass from the upper end of the chamber 192, downward through the ports 202 into the bore 197 and out the ports 198 to the lower end of chamber 192 and to the reservoir 191. Then, when compressed air is admitted to the reservoir 191 to initiate a return stroke of the riveting piston, oil passes from the reservoir through the ports 198 into the bore 197 and out the ports 202 to the upper end of the chamber 192. When the upper end of the chamber is filled, the oil from the reservoir 191 acts upon the lower surface of the head of piston 193 and forces the piston upward. Upon the initial upward movement of the piston, the upper end of bushing 199 engages the head of valve 201, thus closing the ports 202, and during the subsequent upward movement of the piston the several elements 193, 199 and 201 move together as a unit and the valve remains in closed position. The oil above the piston 193 is forced out a passageway 205 which opens into the upper end of chamber 192 and connects, in a manner not shown herein, to the return oil hose 194 (Fig. 1).

Figure 7:
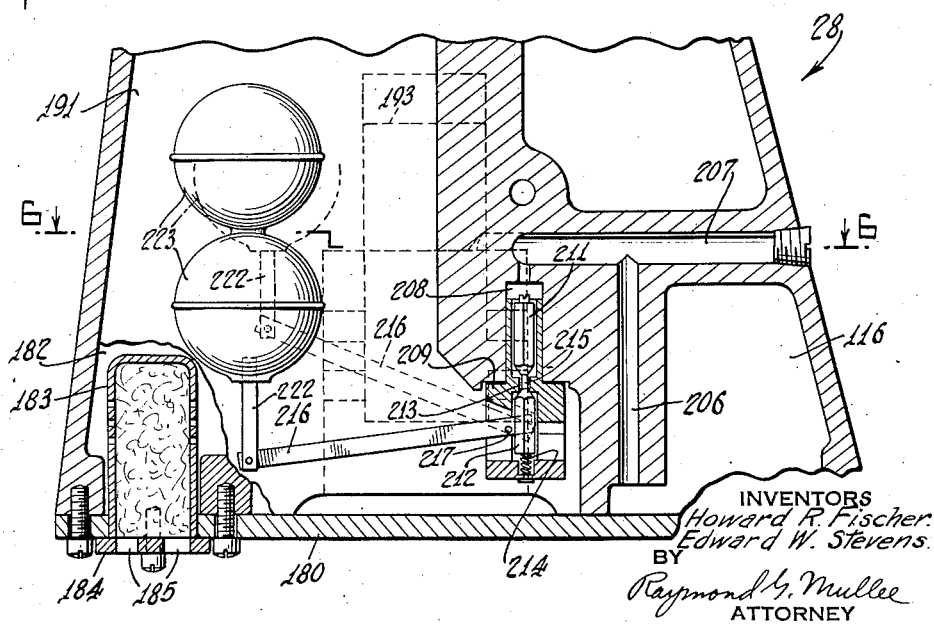
Fig. 7 is a sectional view taken substantially along the broken line 7—7 of Fig. 6.

In the present hydraulic system, as in those of a similar class, a certain amount of oil seepage takes place about the piston head 35 in the chamber 34. In general, the seepage in one direction past the piston is counteracted by seepage in the opposite direction during a different part of the cycle but, as a practical matter, real equality of balance is rarely if ever attained. Thus, in the present instance, the amount of oil which seeps from the upper end of chamber 34 to its lower end during extended operation of the machine exceeds by a considerable amount the seepage which takes place during the same period in the opposite direction. Also, if the machine stands idle for a protracted period, with the air pressure turned on, oil will pass from the lower end of chamber 34 to the upper end and none at all return in the opposite direction. Excessive seepage in either direction past the piston head 35 will cause a variation in the normal level of the oil within return reservoir 191. Should this level go too high the oil may overflow into the air passages and if the level goes too low the supply therein may be insufficient to operate the return piston 193. Wide variations of the oil level in reservoir 191 are, therefore, undesirable and, in order to confine variations within narrow limits certain additional control mechanism is provided. As shown in Figs. 6, 7 and 8 the return reservoir 191 and the prefill reservoir 116 are connected by a pair of passageways 206 and 207, the latter of which is in communication with a bore 208 (Fig. 7) opening into the reservoir 191. The passageway 207 communicates also with the pressure chamber 192 (see Figs. 3 and 6) at a point above the head of piston 193, so that, during the prefill operation, oil passes from the reservoir 116 through the passageways 206 and 207 and acts to return the piston 193 downward. The previously mentioned passageway 195, shown in Figs. 13, 14 and 15, is a diagrammatic representation of the connection, effected by passageways 206 and 207, between the reservoir 116 and chamber 192.

Positioned within the bore 208 (Figs. 7 and 8) and extending below it into the reservoir 191 is a block 209 which acts as a bushing for a pair of oppositely disposed valves 211 and 212 which control the flow of oil through a narrow opening 213 in the block. The valves 211 and 212 are spaced slightly from the inner guide walls of the block 209 to permit the oil to pass around the valves to the opening 213. The valve 212 is urged upward to closed position by a spring 214 and is formed with a stem or extension 215 which passes through the opening 213 and underlies the lower end of valve 211. With valve 212 in upper or closed position the extension 215 thereof engages the valve 211 and holds it off its seat, in open position. As shown in Fig. 8 the mid-portions of the valve 212 and block 209 are slotted vertically to permit the passage of oil to and from the valve and to receive one end of a lever 216 pivoted, at 217, to an inner wall of the block. The lever 216 bears, at its left hand end, as viewed in Fig. 8, a laterally extending stud 218 which passes through an opening 219 in the valve 212 and projects into a horizontal slot 221 formed in the block 209. The valve 212 may thus be raised and lowered by operation of the lever 216 which is movable about its pivot point 217 a distance limited to the range of movement permitted the stud 218 by the opposite edges of the slot 221. The right hand end of the lever 216, as viewed in Fig. 8, is pivotally connected to a rod 222 secured to the lower one of a pair of connected buoyant elements 223 which float on the surface of the oil in reservoir 191. The rise and fall of the oil in this reservoir is reflected, therefore, in a corresponding movement of the lever 216 and a consequent downward or upward movement of the valve 212. When the oil level in reservoir 191 rises sufficiently to cause the opening of valve 212 oil may pass from the reservoir, through the opening 213 past valve 211 and through the passages 207 and 206 to the prefill reservoir 116. As the oil level drops in reservoir 191 the lever 216 is caused to move in a clockwise direction (Fig. 8) and lift valve 212 to closed position in which position, the extension 215 thereof may lift valve 211 off its seat to permit oil from the prefill reservoir to pass downward through the opening 213 and around valve 212 into the return reservoir. In order that the valve 212 may be partly unseated at this time, it is permitted a slight movement relatively to the lever 216. It will be noted that the opening 219 in the valve, through which the stud 218 is passed, is of slightly greater diameter than the stud. The valve 212 is held in its fully closed position by the spring 214 while the stud 218 is held a short distance below the upper edge of the opening 219 by reason of its engagement with the upper edge of the slot 221. Thus the valve 212 may be moved downward a distance sufficient to permit oil to flow downward through the opening 213, even though the lever 216 and buoyant elements 223 be in their lowermost positions. The relative movement of the valve 212, at this time, is not enough to permit the valve 211 to return to its seat. Valve 211 will close only when the buoyant elements 223 rise and pull valve 212 a further distance off its seat. The exchange of oil between the prefill reservoir and the return reservoir takes place when compressed air is admitted to these respective chambers, and it will be noted that, by reason of the construction of the valves 211 and 212, an exchange of oil will take place during each cycle of machine operation. The valves 211 and 212 cannot occupy their seats at the same time and it is always possible to force oil in one direction or the other through the opening 213. When live air is admitted to prefill reservoir 116 during the rivet setting portion of the cycle, oil is forced past the valves 211 and 212 until the oil level in the return reservoir rises to a point where valve 212 will be pulled fully off its seat and valve 211 permitted to drop to closed position. Then when air under pressure is admitted to the return reservoir 191, during the piston return or normalizing portion of the cycle, oil is forced past the valves 212 and 211 into the prefill reservoir until the oil level in the return reservoir drops sufficiently to permit valve 212 to move to fully closed position. If there is an excessive amount of oil in the return reservoir, the valve 212 remains open for a period longer than normal. If there is a lack of oil in the return reservoir, a correspondingly longer time is required to pull valve 212 off its seat, during the rivet setting stroke, and additional oil may flow from the prefill reservoir past the open valve 211.

As pointed out in the description of the riveting unit 20 the several sections of this unit are interchangeable and the unit may easily be adapted to meet the requirements of any particular riveting work. Occasionally, however, a class of work is encountered which requires frequent changes from one type of riveting unit to another. In such instances, the more practical manner of working is to provide a plurality of riveting units, each differently arranged, and to select one or another for use, as the work shall require. In order to simplify this manner of working the present power generating unit is so constructed as to permit the attachment thereto of two riveting units, and a manually controlled two way valve assembly is provided whereby the units may be alternatively conditioned for operation.

The two way valve assembly has been previously identified as a unit by the reference numeral 77 (Fig. 1) and is comprised in a projecting portion 224 of the base casting, a valve chamber 225, above the portion 224, and an intermediate guide block 226 positioned between the elements 224 and 225 and secured thereto. The assembly is shown in section in Fig. 10 and, as shown therein, the chamber 225 is formed with an air inlet 227 to which air, at reduced pressure, is conducted from the main air passage below metering orifices 106 and 154 through the intermediate throttle hose 76. Also formed in the chamber 225 is a pair of air outlets 228 and 229, each of which receives one end of a respective main throttle hose 78. The projecting portion 224 is formed with a high pressure oil passageway 231 and a pair of outlets 232 and 233 each of which receives one end of a respective oil hose 119. The machine illustrated in Fig. 1 has only one riveting unit attached thereto but it will be evident that additional hose lines 78 and 119 can be readily attached to the respective outlets 229 and 233. A second return oil hose 194 must also be used with the second riveting unit and there is accordingly provided, as shown in Fig. 3, a second outlet 205 in communication with the chamber 192. When only one riveting unit is attached to the machine, the second outlet 205 must be closed by a suitable plug. Returning now to a consideration of the valve mechanism shown in Fig. 10, there is positioned within the chamber 225 a valve 234, and within the projecting portion 224 a valve 235. The valves 234 and 235 are rotatable within respective bores and associated with each valve is a respective valve stem 236 or 237 positioned within the intermediate guide block 226. Each of the stems 236 and 237 is formed, at one end, with projecting lugs 238 (see Fig. 11) adapted to fit into correspondingly shaped recesses cut in the adjacent end of its associated valve. The opposite end of each stem is cut away to form a generally rectangular portion 239 which extends into a correspondingly shaped slot cut in the inner end of a lever 241 which extends outside the guide block 226 and is accessible for manual operation. The valves 234 and 235, the stems 236 and 237, and the operating lever 241 are thus interfitting and are rotatable as a unit. The valve 234 is formed with a longitudinal passage 242, near its upper end, and with a similar passage 243, near its lower end, positioned at right angles to the vertical plane of the upper passage. Formed in the chamber 225 on opposite sides of the valve 234, adjacent the passage 242, is a port 244 communicating with the outlet 228 and a port 245 communicating with a passageway 246 leading to the air inlet 227. Similar ports 247 and 248 are formed on opposite sides of the valve 234, adjacent the passage 243, these ports leading respectively to the outlet 229 and the passageway 246. It will be evident that by rotation of the valve 234 90° in opposite directions communication may be established alternatively between the passageway 246 and the outlets 228 and 229.

A generally similar arrangement of ports and passageways is used to direct oil alternatively to the outlets 232 and 233 in the projecting portion 224. In this instance, however, oil passes directly from passageway 231 through a passage 249 in the valve 235 to the outlet 232, but passes indirectly to outlet 233 through upper and lower openings 251 and 252 which are connected by a longitudinal passage 253 formed in the valve. The operating lever 241 is movable to two different positions to rotate the valves 234 and 235 and the valves are so arranged that in one position of the lever air is directed to outlet 228 and oil to outlet 232, while in the other position of the lever air is directed to outlet 229 and oil to outlet 233. In order that the valves 234 and 235 may be maintained in a proper vertical position with respect to the ports and passageways which they control, a compression spring 254 is interposed between each valve and the adjacent end of its associated stem.

The means for directing high pressure oil to the two way valve assembly has not yet been fully described. As shown in Fig. 3 the passageway 231 which extends into the projecting portion 224 opens, at its other end, directly into the mid-portion of the pressure chamber 118 through which the piston rod 134 reciprocates. Oil from the prefill reservoir 116 is introduced into the chamber 118 through the passage 117 which communicates, through a longitudinal passage 255, with a recessed portion 256 of the chamber 118. Fixed within the chamber 118 is a bushing 257 which covers the recess 256 and extends downward to a point just above the passageway 231. A pair of ports 258 are formed in the bushing 257 adjacent the recess 256. In the noormal position of the driving piston 133—134, the lower end of the rod 134 lies within the upper end of the bushing 257 just above the ports 258. Thus when compressed air enters the reservoir 116 the oil is permitted to pass through the ports 258 into the chamber 118, and a like amount of the oil is driven out the passageway 231 to complete the rivet setting operation. Subsequently, the piston rod 134 moves downward and, by reason of a sliding fit with the bushing 257, immediately closes the ports 258. Throughout the continued downward movement of the shaft 134 the oil within the chamber 118 is forced out the passageway 231 under great pressure. It will be noted that the bushing 257 acts as a seal to prevent the escape of oil from the lower part of chamber 118 to the upper part and hence renders more elaborate seals and packing unnecessary.

It has been previously described how the peak pressure obtainable in the compression chamber 132 may be varied by operation of the adjusting screw 139 (Figs. 13–16) to vary the pressure with which the relief valve 137 is urged to closed position. It is desirable to vary the peak pressure obtainable in the chamber 132 since, by this means, each riveting operation may be performed with a maximum of efficiency. In heading rivets of different size the screw 139 is set in accordance with the size of the rivet to raise or lower the air pressure within the chamber 132. It will be evident that by reason of this adjustable means a considerable saving of time and compressed air is effected. To assist the operator in determining the proper setting of the screw 139 for each size rivet a standard pressure gauge, which may be caused to register the degree of pressure within the chamber 132, is affixed to the machine. Referring to Figs. 4 and 5, the pressure gauge is indicated at 259 and has the usual stem 261 which is actuated to obtain the reading. The gauge 259 is threaded into a projecting portion of the closure plate 87 enclosing the lower end of the prefill valve bushing 86 and communicates indirectly with the main compression chamber 132. A passageway 262 leads in a manner not herein shown to the chamber 132 and opens into a bore 263 formed in the projecting portion of the above-mentioned closure plate 87. A passage 264 (Fig. 4) connects a reduced portion of the bore 263 to the gauge 259, and a manually operable plunger valve 260 is positioned in the reduced portion of the bore for controlling the flow of air to the passage 264. By reason of the valve 260, the gauge 259 is normally cut off from communication with the chamber 132 and when it is desired to ascertain the pressure within the chamber, the valve 260 is actuated and the operating trigger 63 compressed to initiate a cycle of operation.

One of the remaining structural features to be considered is a pair of shut off valves 265 and 266 (Fig. 3) positioned in the respective passageways 165 and 115. The passageways 165 and 115 conduct air to the respective reservoirs 191 and 116 and the valves 265 and 266 are provided in order that these passageways may be closed, when transporting the machine, to prevent oil from flowing into the head of the machine. The valves 265 and 266 are similar in construction and operation, and only the valve 265 is shown in detail herein. As shown in Fig. 9 the valve 265 is positioned in a bore 267 which connects separate portions of the passageway 165 and branch 166 thereof. The valve is adapted to be moved manually through the bore 267 to close the portion of passageway 165 which extends downward to the return reservoir 191.

As a further means of controlling communication between the reservoirs 116 and 191 and their respective passageways 115 and 165, a baffle plate is provided in each reservoir in order that air from the passageways will not churn up the oil to such an extent as to create a mist which might enter the air passages. As shown in Fig. 3, each baffle plate comprises a pair of discs 268 and 269 spaced apart and held in a fixed position by a screw 271 which extends through the upper end of the base casting. The two baffle assemblies are identical and a description of the one positioned in reservoir 191 will suffice for both. The upper disc 268 is perforated and abuts against shoulders formed in the casting to create a chamber 272 in the upper end of the reservoir. The lower end of the passageway 165 opens into the chamber 272 and the air discharged therefrom passes through the perforations in disc 268 and is so deflected by the lower disc 269 as to exert a substantially even pressure on the entire surface of the oil.

A collection of air in certain sections of the hydraulic system is unavoidable. In the riveting unit, when one cylinder 23 is replaced by another, air is trapped in the cylinder and connecting oil passages. In the power generating unit, air from the compression chamber 132 gradually accumulates in the oil pressure chamber 118 and connecting passageways. A simple but effective method has been devised for removing the air trapped in these sections of the hydraulic system. Considering first the riveting unit and referring to Fig. 17, the cylinder 23 is formed with an opening 273 which opens directly into the upper end of the chamber 34 and with an opening 274 which opens into the lower end of return oil passageway 33. The openings 273 and 274 are closed by respective plugs 275 and 276. To remove the air trapped in cylinder 23 above the piston 35, the plug 275 is loosened sufficiently to allow air to escape slowly along the threads thereof. Then, with the unit suspended in the position shown in Fig. 17, the trigger 63 is compressed to an intermediate position and the oil which is thus caused to flow through the passageway 32 and into the upper end of the chamber 34 forces the air out the opening 273. When oil appears through the threads of the plug 275 the plug is again tightened. To remove the air trapped in the cylinder 23 below the piston 35, the unit should be held in a position inverted from that shown in Fig. 17. The plug 276 is then loosened and, with all valves in normal position, return pressure oil entering the cylinder through passageway 33 will force the trapped air out the opening 274.

Air is forced from the pressure chamber 118 through the previously mentioned passage 255 (Fig. 3) one end of which communicates with the upper end of chamber 118 and the other end of which may open through the base casting to atmosphere. The outer end of the passage 255 is normally closed by a plug 277. A filler port 278, through which oil is supplied to the prefill reservoir 116, is provided and it will be noted that the upper end of the filler port lies slightly above the level of the outer end of passage 255. To remove the air trapped in chamber 118 and passage 255, the plug 277 and the plug closing the filler port 278 are removed and oil is poured through the filler port into the prefill reservoir until it flows out the passage 255. At this point the plug 277 is replaced loosely and the filling of the prefill reservoir continued until all the trapped air escapes along the loosely fitting threads of the plug 277. When oil appears along the threads, the plug is tightened.

In accordance with the usual construction of machines of this general class, an air line oiler of any suitable type may be provided in order that a small amount of oil may be introduced into the live air as a lubricant for the valves and air operated pistons.

While the invention has been described with particular reference to a riveting machine, it is susceptible of embodiment in machines for other uses, such as pressing, pulling, crushing, punching and embossing.

In a divisional application, filed August 15, 1942, in the names of Howard R. Fischer and Edward W. Stevens, Serial No. 454,973, there are claims to a hydraulic power plant in combination with a riveting tool having manipulative means thereon for remotely controlling the generating assembly or plant, as illustrated and described in this parent application. The divisional case aforementioned also claims the combination of a plurality of riveting tools with a valve arrangement, such as shown in Fig. 10 of the parent application, for selectively connecting one riveter or another with the generator. The riveting tool per se, illustrated in Fig. 17 hereof is the sole invention of Howard R. Fischer and is claimed in his divisional application Serial No. 482,575 filed April 10, 1943.

The tank level control apparatus, shown best in Figs. 7 and 8 hereof, forms the subject matter of still another divisional application, Serial No. 559,762, filed by applicants on October 21, 1944.

What is claimed is:

1. In a power generating unit, the combination of an oil reservoir, a pressure chamber having an outlet at one end and communicating at the same end with said reservoir, a piston movable within said pressure chamber and acting during its stroke to close said chamber from communication with said reservoir, a compressed air distributing system including a main air line, means for directing air from said air line to said reservoir, means for directing air from said air line to the end of said pressure chamber opposite to that in communication with the reservoir, a compressed air distributing valve settable to a plurality of positions and adapted in a first of said positions to prevent the flow of air to said reservoir and said pressure chamber and adapted in a second of said positions to permit the flow of air to said reservoir and adapted in a third of said positions to permit the flow of air to said reservoir and said pressure chamber, pressure fluid means for moving said distributing valve from first to second positions and from second to third positions, and manipulative means operable from a normal to partly and fully actuated positions for controlling said pressure fluid means to effect the movement of said distributing valve automatically and in successive steps.

2. In a power generating unit, the combination of an oil reservoir, a pressure chamber having an outlet at one end and communicating at the same end with said reservoir, a piston movable within said pressure chamber and acting during its stroke to close said chamber from communication with said reservoir, a compressed air distributing system including a main air line, means for directing air from said air line to said reservoir, means for directing air from said air line to the end of said pressure chamber opposite to that in communication with the reservoir, a control valve for controlling the flow of air to said pressure chamber, means for directing air from said main air line to said control valve and in a direction to set said valve to open position, a distributing valve settable to a plurality of positions and adapted when set in one of said positions to prevent the flow of air to said reservoir said pressure chamber and said control valve and adapted when set in a second of said positions to permit the flow of air to said reservoir and said control valve and adapted when set in a third of said positions to permit the flow of air to said reservoir said control valve and said pressure chamber, and means for retarding the movement of said control valve to open position.

3. In a power generating unit, the combination of an oil reservoir, a pressure chamber having an outlet at one end and communicating at the same end with said reservoir, a piston movable within said chamber and acting during its stroke to close said chamber from communication with said reservoir, a compressed air distributing system including a main air line, a first passageway connecting said main air line and said oil reservoir whereby air pressure is introduced into said reservoir, a second passageway connecting said main air line and the end of said pressure chamber opposite to that in communication with the reservoir, a control valve acting normally to prevent the flow of air through said second passageway, a third passageway leading from said main air line and arranged to deliver air in a direction to shift said control valve out of flow preventing position, a distributing valve settable to a plurality of positions for controlling the flow of air through said passageways and adapted when set in one position to prevent the flow of air through all three of the said passageways and adapted when set in another position to permit the flow of air through all three of the said passageways, and means for retarding the movement of said control valve from flow preventing position whereby the opening of said second passageway occurs after the opening of said first passageway.

4. In a power generating unit, the combination of a pressure fluid feed line, a control valve, a connecting passage between said feed line and said control valve arranged to deliver pressure fluid in a direction to shift said control valve from a normal position, a distributing valve for controlling the flow of pressure fluid through said connecting passage and settable to an open and closed position with respect to said passage, a piston chamber, a connecting passage between said feed line and said piston chamber controlled jointly by said distributing valve and said control valve whereby communication is established between said feed line and said chamber when said distributing valve has been set to open position and said control valve shifted from normal position, and an exhaust passage controlled by said distributing valve and communicating in the closed position of said valve with that portion of the last recited said connecting passage between said distributing valve and said piston chamber.

5. In a power generating unit, the combination of a pressure fluid feed line, a control valve, a connecting passage between said feed line and said control valve arranged to deliver pressure fluid in a direction to shift said control valve from a normal position, a distributing valve for controlling the flow of pressure fluid through said connecting passage and settable to an open and closed position with respect to said passage, a piston chamber, a connecting passage between said feed line and said piston chamber controlled jointly by said distributing valve and said control valve whereby communication is established between said feed line and said chamber when said distributing valve has been set to open position and said control valve shifted from normal position, an exhaust passage controlled by said distributing valve and communicating in the closed position of said valve with that portion of said connecting passage between said distributing valve and said piston chamber, an auxiliary valve acted upon by the fluid in said piston chamber, means responsive to an opening movement of said auxiliary valve for initiating automatically movement of said distributing valve to closed position, resilient means urging said means to closed position, and means for adjusting said resilient means to vary the pressure exerted thereby and consequently to vary the peak pressure obtainable in said piston chamber.

6. In a compressed air distributing system including a main air line, the combination of a distributing valve for controlling the flow of air from said main air line and settable in response to pressure variations at the opposite ends thereof to a plurality of longitudinal positions, a pair of air chambers each enclosing a respective end of said distributing valve, a passageway connecting said main air line and one of said air chambers, a pair of passageways connecting said main air line and the other of said air chambers, a control valve for controlling the flow of air through said pair of passageways and adapted when set in one position to permit the flow of air through the first of said pair of passageways and to prevent the flow of air through the second of said pair of passageways and adapted when set in another position to permit the flow of air through the second of said pair of passageways, and means for variably reducing the pressure of the air in the first of said pair of passageways.

7. In a compressed air distributing system including a main air line, the combination of a distributing valve for controlling the flow of air from said main air line and settable in response to pressure variations at the opposite ends thereof to a plurality of longitudinal positions, a pair of air chambers each enclosing a respective end of said distributing valve, a passageway connecting said main air line and one of said air chambers, a pair of passageways connecting said main air line and the other of said air chambers, a control valve for controlling the flow of air through said pair of passageways and adapted when set in one position to permit the flow of air through the first of said pair of passageways and to prevent the flow of air through the second of said pair of passageways and adapted when set in another position to permit the flow of air through the second of said pair of passageways, means for variably reducing the pressure of the air in the first of said pair of passageways, and means controlled by said distributing valve for setting said control valve in position to permit the flow of air through the second of said pair of passageways.

8. In a pressure fluid distributing system, the combination of an oil reservoir, a pressure chamber having an outlet at one end and communicating at the same end with said reservoir, a piston movable within said pressure chamber and acting during its stroke to close said chamber from communication with said reservoir, a compressed air distributing system including a main air line, means for directing air from said air line to said reservoir, means for directing air from said air line to the end of said pressure chamber opposite to that in communication with the reservoir, a control valve for controlling the flow of air to said pressure chamber, means for directing air from said main air line to said control valve and in a direction to set said valve to open position, and a distributing valve settable to a plurality of positions and adapted when set in one of said positions to prevent the flow of air to said reservoir said pressure chamber and said control valve and adapted when set in a second of said positions to permit the flow of air to said reservoir and said control valve and adapted when set in a third of said positions to permit the flow of air to said reservoir said control valve and said pressure chamber.

9. In a pressure fluid distributing system, the combination of an oil reservoir, a pressure chamber having an outlet at one end and communicating at the same end with said reservoir, a piston movable within said chamber and acting during its stroke to close said chamber from communication with said reservoir, a compressed air distributing system including a main air line, a first passageway connecting said main air line and said oil reservoir whereby air pressure is introduced into said reservoir, a second passageway connecting said main air line and the end of said pressure chamber opposite to that in communication with the reservoir, a control valve acting normally to prevent the flow of air through said second passageway, a third passageway leading from said main air line and arranged to deliver air in a direction to shift said control valve out of flow preventing position, and a distributing valve settable to a plurality of positions for controlling the flow of air through said passageways and adapted when set in one position to prevent the flow of air through all three of the said passageways and adapted when set in another position to permit the flow of air through all three of the said passageways, said valve being arranged to open said passageways during its movement from said one position to said other position and to open said third passageway subsequent to the opening of said first and second passageways.

10. In a pressure fluid distributing system, the combination of a piston chamber, a pressure fluid feed line, a first passageway connecting said feed line and said piston chamber, a distributing valve for controlling the flow of pressure fluid through said first passageway and adapted when set in a first position to prevent the flow of pressure fluid through said passageway and adapted when set in a second position to permit the flow of pressure fluid through said passageway, a second passageway leading from said feed line to said distributing valve and arranged to deliver pressure fluid in a direction to move said valve to its second position, spring means urging said distributing valve to its first position, third and fourth passageways leading from said feed line to said distributing valve and arranged to deliver pressure fluid in a direction to move said valve to its first position, means for reducing the pressure of the air in said third passageway, a control valve for controlling the flow of pressure fluid through said fourth passageway and adapted when set in a first position to prevent the flow of pressure fluid through said passageway and adapted when set in a second position to permit the flow of pressure fluid through said passageway, and a fifth passageway leading from said piston chamber to said control valve and arranged to deliver pressure fluid in a direction to move said control valve to its second position.

11. In a compressed air distributing system including a main air line, the combination of a distributing valve for controlling the flow of air from said main air line and settable in response to pressure variations at the opposite ends thereof to a plurality of longitudinal positions, a pair of air chambers in communication with said main air line and each enclosing a respective end of said distributing valve, spring means urging said distributing valve to a normal longitudinal position, means for unbalancing the air pressures in said air chambers to effect longitudinal movement of said distributing valve from normal position, the movement of said distributing valve in one direction from normal position being resisted by said spring means, and an auxiliary spring means arranged to aid the first said spring means and enabled by a movement of said distributing valve beyond a predetermined off-normal position.

12. In a pressure fluid distributing system, the combination of a pressure fluid source, a distributing valve controlling the flow of pressure fluid from said source and settable in response to pressure variations at the opposite ends thereof to a plurality of longitudinal control positions, separate fluid conducting passageways leading from said pressure fluid source to the respective ends of said distributing valve, yielding means holding said distributing valve in a normal control position, means for effecting a step-by-step variation in the fluid pressure at one end of said valve to initiate movement of said valve to and from successive off-normal control positions, said yielding means resisting movement of said distributing valve from normal position, and additional yielding means resisting movement of said distributing valve from one to another of the off-normal positions.

13. In a pressure fluid distributing system, the combination of a hydraulic circuit including two oil reservoirs, a piston chamber one end of which communicates with one of said oil reservoirs and the other end of which communicates with the other of said oil reservoirs, a compressed air distributing system including a main air line, a first passageway connecting said main air line and one of said oil reservoirs, a second passageway connecting said main air line and the other of said oil reservoirs, a compressed air distributing valve adapted when set in one position to permit the flow of air through said first passageway and prevent the flow of air through said second passageway and adapted when set in another position to prevent the flow of air through said first passageway and permit the flow of air through said second passageway, a manipulative element, means responsive to operation of said manipulative element for moving said valve from the first said position to the second said position, means independent of said manipulative element for returning said valve to the first said position and applying a holding pressure thereto, and means responsive to the release of said manipulative element for disabling said independent means.

14. In a pressure fluid distributing system, the combination of a piston chamber, a hydraulic circuit extending to said piston chamber, a source of compressed air, a manipulative element, automatic means responsive to operation of the manipulative element for applying to the hydraulic circuit a pressure first equal to then greater than the pressure of the compressed air at its source, automatic valve means for releasing the pressure in the hydraulic circuit prior to the release of the manipulative element, including a pilot valve, and means disabled by the release of said manipulative element for holding said pilot valve in pressure releasing position while said manipulative element is held operated.

15. In a pressure fluid distributing system, the combination of a piston chamber, a hydraulic circuit extending to said piston chamber, a compressed air distributing system for actuating said hydraulic circuit to establish operating pressures in said piston chamber, said system including a distributing valve movable in response to pressure variations at opposite ends thereof to a plurality of control positions, means for directing fluid of equal pressure to the ends of said valve, resilient means for holding the valve in a normal position when the fluid pressures at the ends of the valve are balanced, means for effecting successive fluid pressure variations at the ends of said valve through a step-by-step reduction of the pressure at one end thereof, and a preloaded spring arranged to supplement said resilient means upon movement of the distributing valve to a first off-normal position and yieldingly resist movement thereof to a second off-normal position.

16. In a pressure fluid distributing system, the combination of a hydraulic circuit including an oil reservoir, a piston chamber communicating with said oil reservoir, a compressed air distributing system including a main air line, a first passageway for conducting air from said main air line to said oil reservoir whereby line pressure is transmitted through said hydraulic circuit and established in said piston chamber, a pressure chamber through which the oil from said reservoir flows to said piston chamber, a piston reciprocable in said pressure chamber to intensify the pressure in said piston chamber, a second passageway for conducting air to said intensifier piston in a direction to effect a power stroke of said piston, a compressed air distributing valve controlling the flow of air through said first and second passageways and movable from a normal to first and second positions successively to open said first and second passageways, a manipulative element operable to initiate movement of said valve from normal to the said first and second positions thereof, means independent of said manipulative element for returning said valve to normal and applying a holding pressure thereto, and means responsive to the release of said manipulative element for disabling said independent means.

17. In a pressure fluid distributing system, the combination of a hydraulic circuit including an oil reservoir, a piston chamber communicating with said oil reservoir, a compressed air distributing system including a main air line, means for conducting air from said main air line to said oil reservoir to prefill the communicating area between said reservoir and said piston chamber and establish line pressure in said piston chamber. a compressed air operated booster device for intensifying the pressure in said piston chamber following the prefill operation, compressed air distributing control means for initiating successively the prefill and intensifying operations, said means including a distributing valve settable from a normal position to successive off-normal positions to effect a cycle of distribution, means for operating said valve by causing fluid pressure variations at the opposite ends thereof, said means including a fluid pressure control element for exhausting fluid at a variable rate from one end of said valve, and a yielding means encountered by said valve as it moves from normal position and defining a first one of said off-normal positions.

18. In a pressure fluid distributing system, the combination of a hydraulic circuit including an oil reservoir, a piston chamber communicating with said oil reservoir, a compressed air distributing system including a main air line, means for conducting air from said main air line to said oil reservoir to prefill the communicating area between said reservoir and said piston chamber and establish line pressure in said piston chamber, a compressed air operated booster device for intensifying the pressure in said piston chamber following the prefill operation, compressed air distributing control means for initiating successively the prefill and intensifying operations, said means including a distributing valve settable from a normal position to successive off-normal positions to effect a cycle of distribution, and means for operating said valve by causing fluid pressure variations at the opposite ends thereof, said means including a fluid pressure control element for exhausting fluid at a variable rate from one end of said valve and including a pair of springs urging the distributing valve toward normal position, one of the springs being effective to move the valve away from one off-normal position but not away from an intermediate off-normal position.

19. In a hydraulic distributing system, a source of pressure fluid; an intensifier responsive to fluid pressure from said source to apply a transformed or higher pressure to a hydraulic fluid; a working cylinder having a piston therein; a distributing valve having a normal, an intermediate, and a fully operated position; a first set of fluid passageways established in the normal position of the distributing valve for actuating the working piston on its return stroke; a second set of passageways established in the intermediate position of the distributing valve and leading from the source to the working cylinder to supply hydraulic fluid thereto at line pressure for the start of the power stroke; a third set of passageways established in the fully operated position of the distributing valve and leading from the source and extending through said intensifier to the working cylinder to supply hydraulic fluid thereto at transformed pressure for the completion of the power stroke; and additional valve means for maintaining said third set of passages in closed or ineffective condition until a predetermined time after the distributing valve has been moved to the intermediate position.

20. In a hydraulic distributing system, a source of pressure fluid; an intensifier responsive to fluid pressure from said source to apply a transformed or higher pressure to a hydraulic fluid; a working cylinder having a piston therein; a distributing valve having a normal, an intermediate, and a fully operated position; a first set of passageways established in the normal position of the distributing valve and leading from said source through the valve to the front end of the working cylinder for actuating the working piston on its return stroke; a second set of passageways established in the intermediate position of the distributing valve and leading from the source to the rear end of the working cylinder to supply hydraulic fluid thereto at line pressure for the start of the power stroke; a third set of passageways established in the fully operated position of the distributing valve and leading from the source and extending through said intensifier to the rear end of the working cylinder to supply hydraulic fluid thereto at transformed pressure for the completion of the power stroke; additional valve means for maintaining said third set of passageways in closed or ineffective condition until a predetermined time after the distributing valve has been moved to the intermediate position; operating means for the distributing valve including a manipulative device having three positions of adjustment corresponding to the three positions of the distributing valve, whereby on the power stroke the conversion from line pressure to transformed pressure is under the direct control of the operator, after the lapse of said predetermined time.

21. In a hydraulic distributing system, a source of pressure fluid; an intensifier responsive to fluid pressure from said source to apply a transformed or higher pressure to a hydraulic fluid; a working cylinder having a piston therein; a distributing valve having a normal, an intermediate, and a fully operated position; a first set of passageways established in the normal position of the distributing valve and leading from said source through the valve to the front end of the working cylinder for actuating the working piston on its return stroke; a second set of passageways established in the intermediate position of the distributing valve and leading from the source to the rear end of the working cylinder to supply hydraulic fluid thereto at line pressure for the start of the power stroke; a third set of passageways established in the fully operated position of the distributing valve and leading from the source and extending through said intensifier to the rear end of the working cylinder to supply hydraulic fluid thereto at transformed pressure for the completion of the power stroke; operating means for the distributing valve and including a single manipulative device having normal, intermediate and fully operated positions of adjustment corresponding to the three positions of the distributing valve, whereby on the power stroke the conversion from line pressure to transformed pressure is under the direct control of the operator; an automatic return valve operable upon the attainment of a predetermined pressure in the working cylinder; and automatic shifting means responsive to such operation for moving the distributing valve from fully operated to normal position and for holding it in normal position as long as the manipulative device remains operated.

HOWARD R. FISCHER.
EDWARD W. STEVENS.

CERTIFICATE OF CORRECTION.

Patent No. 2,365,536. December 19, 1944.

HOWARD R. FISCHER, ET AL.

It is hereby certified that error appears in the printed specification of the above numbered patent requiring correction as follows: Page 8, second column, line 35, for "noormal" read --normal--; page 9, first column, line 58, for "dissc" read --disc--; page 10, second column, line 58, claim 5, after "said" insert --auxiliary valve--; and that the said Letters Patent should be read with this correction therein that the same may conform to the record of the case in the Patent Office.

Signed and sealed this 27th day of March, A. D. 1945.

(Seal)
                              Leslie Frazer
                      Acting Commissioner of Patents.